(12) United States Patent
Wang et al.

(10) Patent No.: US 12,469,138 B2
(45) Date of Patent: Nov. 11, 2025

(54) SYSTEMS AND METHODS FOR IMAGE PROCESSING

(71) Applicant: SHANGHAI UNITED IMAGING HEALTHCARE CO., LTD., Shanghai (CN)

(72) Inventors: Xiaodong Wang, Shanghai (CN); Zhifeng Ma, Shanghai (CN); Saisai Su, Shanghai (CN); Gang Su, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 528 days.

(21) Appl. No.: 17/810,322

(22) Filed: Jun. 30, 2022

(65) Prior Publication Data
US 2022/0335613 A1    Oct. 20, 2022

Related U.S. Application Data

(63) Continuation of application No. PCT/CN2020/141089, filed on Dec. 29, 2020.

(30) Foreign Application Priority Data

Dec. 31, 2019  (CN) .......................... 201911423770.6
Dec. 31, 2019  (CN) .......................... 201911424209.X

(51) Int. Cl.
*G06T 7/00*   (2017.01)
*G06T 7/11*   (2017.01)
*G16H 30/40*  (2018.01)

(52) U.S. Cl.
CPC .............. *G06T 7/0014* (2013.01); *G06T 7/11* (2017.01); *G16H 30/40* (2018.01); *G06T 2207/20081* (2013.01); *G06T 2207/30101* (2013.01)

(58) Field of Classification Search
None
See application file for complete search history.

(56) References Cited

U.S. PATENT DOCUMENTS 7,941,462 B2     5/2011  Akinyemi et al.
2003/0208116 A1* 11/2003 Liang ..................... A61B 5/055
                                                      600/407

(Continued)

FOREIGN PATENT DOCUMENTS

CN    102945328 A    2/2013
CN    107871318 A    4/2018

(Continued)

OTHER PUBLICATIONS

The Extended European Search Report in European Application No. 20910740.8 mailed on Dec. 22, 2022, 8 pages.

(Continued)

*Primary Examiner* — Mark R Milia
(74) *Attorney, Agent, or Firm* — METIS IP LLC

(57) ABSTRACT

The present disclosure relates to systems and methods for image processing. The methods may include determining structure data associated with the tissue based on at least one original image of a tissue. The methods may further include determining at least one stenosis region of the tissue based on the structure data associated with the tissue. At least one of the structure data and/or the at least one stenosis region of the tissue may be configured to be displayed on a display device.

15 Claims, 13 Drawing Sheets

(56) References Cited

U.S. PATENT DOCUMENTS

| | | | |
|---|---|---|---|
| 2006/0025674 A1 | 2/2006 | Kiraly et al. | |
| 2009/0207965 A1 | 8/2009 | Sakaguchi | |
| 2011/0224542 A1* | 9/2011 | Mittal | G06T 7/0016 600/425 |
| 2012/0130226 A1* | 5/2012 | Huizenga | G06T 7/0012 600/410 |
| 2012/0226141 A1 | 9/2012 | Shinoda et al. | |
| 2013/0009958 A1 | 1/2013 | Kitamura | |
| 2013/0315457 A1 | 11/2013 | Beymer et al. | |
| 2015/0066818 A1 | 3/2015 | Choi et al. | |
| 2016/0045180 A1 | 2/2016 | Kelm et al. | |
| 2019/0005657 A1 | 1/2019 | Gao et al. | |
| 2019/0318476 A1 | 10/2019 | Isgum et al. | |
| 2020/0202519 A1 | 6/2020 | Wang et al. | |
| 2020/0226761 A1* | 7/2020 | Li | G06T 7/174 |
| 2020/0303049 A1* | 9/2020 | Zhang | G06V 10/82 |

FOREIGN PATENT DOCUMENTS

| | | |
|---|---|---|
| CN | 108399648 A | 8/2018 |
| CN | 108805923 A | 11/2018 |
| CN | 109658407 A | 4/2019 |
| CN | 110310271 A | 10/2019 |
| CN | 111145173 A | 5/2020 |
| CN | 111192664 A | 5/2020 |
| EP | 2405260 A1 | 1/2012 |
| JP | 6491391 B1 | 3/2019 |

OTHER PUBLICATIONS

Majd Zreik et al., A Recurrent CNN for Automatic Detection and Classification of Coronary Artery Plaque and Stenosis in Coronary CT Angiography, IEEE Transactions on Medical Imaging, 2018, 11 pages.

Jelmer M. Wolterink et al., Coronary Artery Centerline Extraction in Cardiac CT Angiography Using a CNN-based Orientation Classifier, Medical Image Analysis, 51: 46-60, 2019.

International Search Report in PCT/CN2020/141089 mailed on Mar. 26, 2021, 5 pages.

Written Opinion in PCT/CN2020/141089 mailed on Mar. 26, 2021, 5 pages.

* cited by examiner

SYSTEMS AND METHODS FOR IMAGE PROCESSING

CROSS-REFERENCE TO RELATED APPLICATIONS

This application is a continuation of International Application No. PCT/CN2020/141089, filed on Dec. 29, 2020, which designates the United States of America and claims priority to Chinese Patent Application No. 201911423770.6 filed on Dec. 31, 2019 and Chinese Patent Application No. 201911424209.X filed on Dec. 31, 2019, the contents of each of which are hereby incorporated by reference.

TECHNICAL FIELD

The present disclosure generally relates to image processing, and in particular, to systems and methods for determining a stenosis region of a tissue.

BACKGROUND

Imaging technologies have been widely utilized in the diagnoses of diseases. The images captured using the imaging technologies may be processed to segment one or more regions of a tissue from the images by removing a portion of the one or more regions, thereby facilitating clinical diagnosis. For example, the coronary artery may need to be segmented from the image of the coronary artery of a patient. However, in some situations, it is difficult to segment the one or more regions due to relatively low contrast between the to-be-removed portion and surrounding area in the image.

In some other situations, doctors may also need to identify and/or analyze the to-be-removed portion to determine its impact on the surrounding area. For example, a plaque on the coronary artery may be analyzed to determine how it may affect the diameter of the coronary artery. However, it may be difficult to label the plaque inside the artery, which is complex. Therefore, it is desirable to provide new systems and methods for segmenting a portion of regions of a tissue from an image and recognizing and/or analyzing a portion of regions of the tissue, thereby improving the diagnosis accuracy and efficiency.

SUMMARY

According to an aspect of the present disclosure, a method for image processing implemented on a computing device having at least one processor and at least one non-transitory storage medium is provided. The method may include determining structure data associated with the tissue based on at least one original image of a tissue. The method may include determining at least one stenosis region of the tissue based on the structure data associated with the tissue. At least one of the structure data and/or the at least one stenosis region of the tissue may be configured to be displayed on a display device.

In some embodiments, to determine the structure data associated with the tissue based on the at least one original image of the tissue, the method may include determining raw data associated with the tissue based on the at least one original image of the tissue. The method may include determining a target region in the at least one original image of the tissue using an identification model. The method may include determining the structure data associated with the tissue based on the raw data and the target region.

In some embodiments, the identification model may be trained based on a training process. The training process may include obtaining a plurality of training images and a plurality of reference images corresponding to the plurality of training images. The training process may include labeling a first region in a reference image for each of the plurality of reference images. The training process may include registering the reference image with a training image of the plurality of training images. The training process may include determining a second region in the training image based on the first labeled region and a registration relationship between the training image and the reference image. The training process may further include generating the identification model by training a preliminary identification model using the plurality of training images each of which may be labeled with a corresponding second region to the first labeled region.

In some embodiments, the plurality of reference images may include a plurality of images of the tissue which is not injected with a contrast agent.

In some embodiments, to determine the at least one stenosis region of the tissue based on the structure data associated with the tissue, the method may include determining radial information associated with at least one portion of the tissue. The method may include determining whether the radial information associated with a portion of the tissue satisfies a preset condition for each of the at least one portion of the tissue. The method may include determining that the portion of the tissue corresponds to a stenosis region of the at least one portion of the tissue in response to that the portion of the tissue satisfies the preset condition.

In some embodiments, the method may further include obtaining first position information associated with at least one region of interest (ROI) of the tissue based on at least one curved planar reformation (CPR) image. The at least one CPR image may correspond to the structure data associated with the tissue. The first position information may indicate a position of the at least one ROI in the at least one CPR image. The method may include obtaining a first mapping relationship between the CPR image and volume data associated with the tissue. The method may further include determining second position information associated with the at least one ROI of the tissue based on the first mapping relationship. The second position information may indicate coordinate information of the at least one ROI in the volume data.

In some embodiments, to determine the second position information associated with the at least one ROI of the tissue, the method may include obtaining a second mapping relationship between pixels of the CPR image and voxels of the volume data. The method may include determining the second position information based on the second mapping relationship and the first position information.

In some embodiments, the method may further include determining at least one portion of at least one parameter associated with the at least one ROI of the tissue. The at least one portion of the at least one parameter associated with the at least one ROI of the tissue may be configured to be displayed on the display device.

In some embodiments, to determine the at least one portion of the at least one parameter associated with the at least one ROI of the tissue, the method may include determining the at least one portion of the at least one parameter based on the second position information. The method may include determining a relationship between the at least one parameter and the first position information based on a third mapping relationship between the first position information and the second position information. The method may further include directing the display device to display the at least one portion of the at least one parameter in the CPR image based on the relationship between the at least one parameter and the first position information.

According to yet another aspect of the present disclosure, a method for displaying a tissue is provided. The method may be implemented on a display device. The method may include displaying at least one of structure data associated with the tissue or at least one stenosis region of the tissue. The structure data associated with the tissue may be determined by a computing device based on at least one original image of the tissue. The at least one stenosis region of the tissue may be determined by a computing device based on the structure data associated with the tissue.

According to yet another aspect of the present disclosure, a system for image processing is provided. The system may include at least one storage device including a set of instructions and at least one processor. The at least one processor may be configured to communicate with the at least one storage device. When executing the set of instructions, the at least one processor may be configured to direct the system to perform the following operations. The system may determine structure data associated with the tissue based on at least one original image of a tissue. The system may determine at least one stenosis region of the tissue based on the structure data associated with the tissue. At least one of the structure data and/or the at least one stenosis region of the tissue may be configured to be displayed on a display device.

In some embodiments, to determine the structure data associated with the tissue based on at least one original image of the tissue, the system may determine raw data associated with the tissue based on the at least one original image of the tissue. The system may determine a target region in the at least one original image of the tissue using an identification model. The system may determine the structure data associated with the tissue based on the raw data and the target region.

In some embodiments, to determine the at least one stenosis region of the tissue based on the structure data associated with the tissue, the system may determine radial information associated with at least one portion of the tissue. The system may determine whether the radial information associated with a portion of the tissue satisfies a preset condition for each of the at least one portion of the tissue. The system may determine that the portion of the tissue corresponds to a stenosis region of the at least one portion of the tissue in response to that the portion of the tissue satisfies the preset condition.

In some embodiments, the system may obtain first position information associated with at least one ROI of the tissue based on at least one CPR image. The at least one CPR image may correspond to the structure data associated with the tissue. The first position information may indicate a position of the at least one ROI in the at least one CPR image. The system may obtain a first mapping relationship between the CPR image and volume data associated with the tissue. The system may determine second position information associated with the at least one ROI of the tissue based on the first mapping relationship. The second position information may indicate coordinate information of the at least one ROI in the volume data.

In some embodiments, to determine the second position information associated with the at least one ROI of the tissue, the system may obtain a second mapping relationship between pixels of the CPR image and voxels of the volume data. The system may determine the second position information based on the second mapping relationship and the first position information.

In some embodiments, the system may determine at least one portion of at least one parameter associated with the at least one ROI of the tissue. The at least one portion of the at least one parameter associated with the at least one ROI of the tissue may be configured to be displayed on the display device.

In some embodiments, to determine the at least one portion of the at least one parameter associated with the at least one ROI of the tissue, the system may determine the at least one portion of the at least one parameter based on the second position information. The system may determine a relationship between the at least one parameter and the first position information based on a third mapping relationship between the first position information and the second position information. The system may direct the display device to display the at least one portion of the at least one parameter in the CPR image based on the relationship between the at least one parameter and the first position information.

According to yet another aspect of the present disclosure, a non-transitory computer readable medium is provided. The non-transitory computer readable medium may include a set of instructions for image processing. When executed by at least one processor, the set of instructions may direct the at least one processor to effectuate a method. The method may include determining structure data associated with the tissue based on at least one original image of a tissue. The method may include determining at least one stenosis region of the tissue based on the structure data associated with the tissue. At least one of the structure data and/or the at least one stenosis region of the tissue may be configured to be displayed on a display device.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
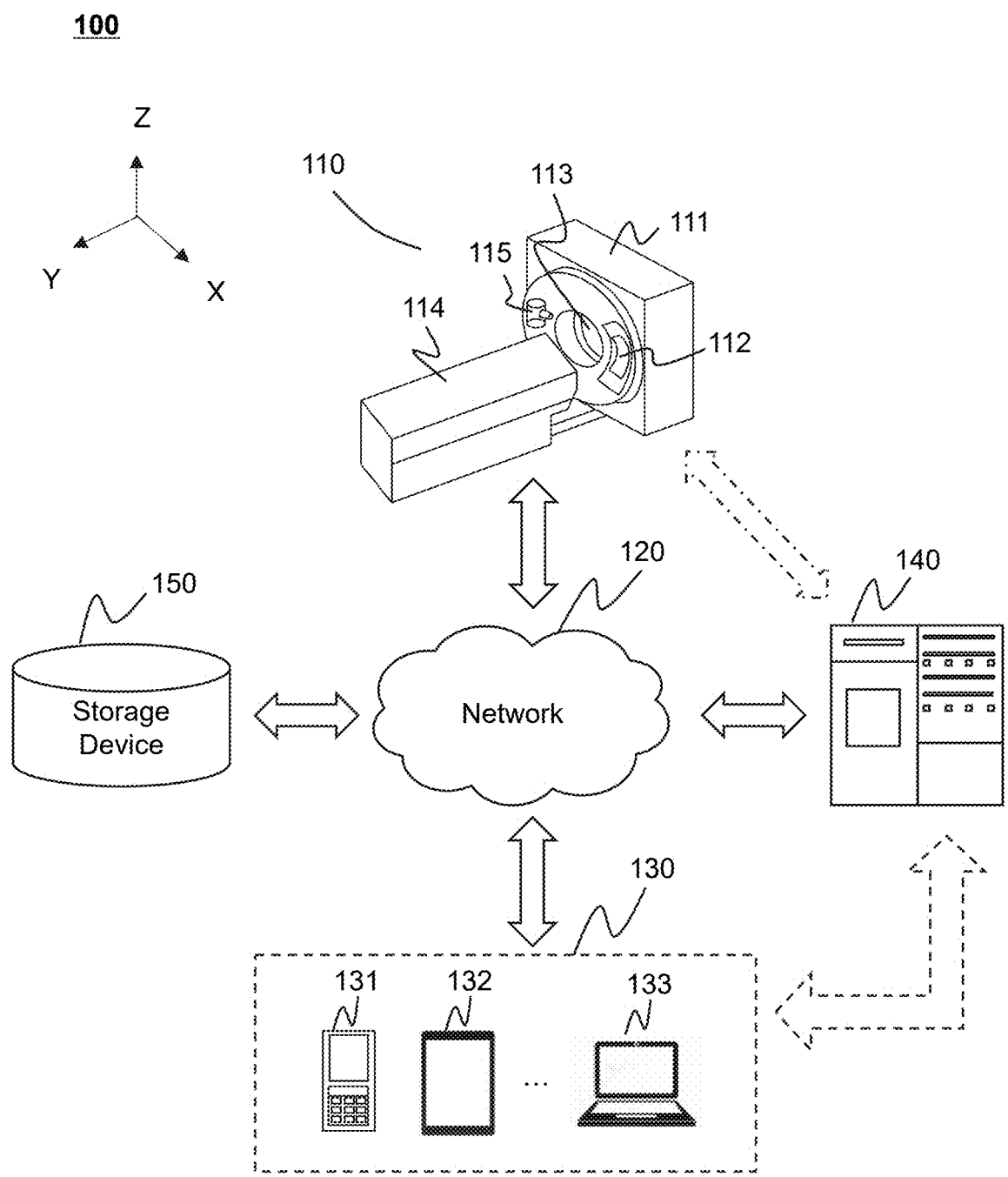
FIG. 1 is a schematic diagram illustrating an exemplary imaging system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the terms "system," "engine," "unit," "module," and/or "block" used herein are one method to distinguish different components, elements, parts, sections, or assemblies of different level in ascending order. However, the terms may be displaced by another expression if they achieve the same purpose.

Generally, the words "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or themselves, and/or may be invoked in response to detected events or interrupts. Software modules/units/blocks configured for execution on computing devices (e.g., a processor 210 illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included in programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module, or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items. The term "image" in the present disclosure is used to collectively refer to image data (e.g., scan data, projection data) and/or images of various forms, including a two-dimensional (2D) image, a three-dimensional (3D) image, a four-dimensional (4D) image, etc. The term "pixel" and "voxel" in the present disclosure are used interchangeably to refer to an element of an image.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Provided herein are systems and methods for non-invasive biomedical imaging, such as for disease diagnostic or research purposes. In some embodiments, the systems may include a single modality imaging system and/or a multi-modality imaging system. The single modality imaging system may include, for example, an ultrasound imaging system, an X-ray imaging system, an computed tomography (CT) system, a magnetic resonance imaging (MRI) system, an ultrasonography system, a positron emission tomography (PET) system, an optical coherence tomography (OCT) imaging system, an ultrasound (US) imaging system, an intravascular ultrasound (IVUS) imaging system, a near infrared spectroscopy (NIRS) imaging system, or the like, or any combination thereof. The multi-modality imaging system may include, for example, an X-ray imaging-magnetic resonance imaging (X-ray-MRI) system, a positron emission tomography-X-ray imaging (PET-X-ray) system, a single photon emission computed tomography-magnetic resonance imaging (SPECT-MRI) system, a positron emission tomography-computed tomography (PET-CT) system, a C-arm system, a digital subtraction angiography-magnetic resonance imaging (DSA-MRI) system, etc. It should be noted that the imaging system described below is merely provided for illustration purposes, and not intended to limit the scope of the present disclosure.

The term "imaging modality" or "modality" as used herein broadly refers to an imaging method or technology that gathers, generates, processes, and/or analyzes imaging information of an object (or a tissue of an object). The object may include a biological object and/or a non-biological object. The biological object may be a human being, an animal, a plant, or a portion thereof. In some embodiments, the object may be a man-made composition of organic and/or inorganic matters that are with or without life. The tissue may include the entire or a portion of the object (e.g., one or more cells, one or more organs, etc.)

In the present disclosure, the term "tissue" and the term "tissue in an image" can be used interchangeably.

An aspect of the present disclosure relates to systems and methods for image processing. The systems and methods may determine at least one stenosis region of a tissue associated with a tissue based on at least one original image of the tissue. The systems and methods may determine at least one stenosis region of the tissue based on the structure data associated with the tissue. The systems and methods may display at least one of the structure data and/or the at least one stenosis region of the tissue.

Conventionally, the structure data and data of one or more anomalies may be extracted together, and the structure data may be identified by presetting a threshold (e.g., CT value threshold, a contrast threshold, etc.). However, the conventional approach may have limited accuracy and/or efficiency. For example, the CT value of the structure data may be overlapped with the CT value of the one or more anomalies, and the CT threshold may be difficult to be determined and the identification of the structure data based on the CT threshold may be not accurate. The systems and methods may adopt an identification model to determine the structure data and/or the at least one stenosis region by processing the at least one original image of the tissue. The identification model may be trained using a plurality of training images and each of the training images may be labeled by registering a reference image with the training image. The structure data and the data of the one or more anomalies are distinctly identified. Compared with the conventional approach, the systems and methods disclosed herein may improve the accuracy and efficiency of stenosis region determination.

In some embodiments, the structure data associated with the tissue and the data of one or more anomalies may be displayed in a display device to provide a reference for a medical diagnosis or treatment. On some occasions, the structure data associated with the tissue and the data of one or more anomalies may be displayed on an MPR image. For some tissue (e.g., a tissue with complicated structures), it is difficult to be observed and analyzed based on the MPR image. The systems and methods disclosed herein may obtain a mapping relationship between the CPR image and volume data. The structure data associated with the tissue and the data of one or more anomalies may be observed, analyzed, and/or displayed based on the CPR image and the volume data, thereby improving the imaging efficiency, and further improving the accuracy and efficiency of the medical diagnosis and/or treatment.

FIG. 1 is a schematic diagram illustrating an exemplary imaging system according to some embodiments of the present disclosure.

As illustrated in FIG. 1, the imaging system 100 may include an imaging device 110, a network 120, a terminal 130, a processing device 140, and a storage device 150. The components in the imaging system 100 may be connected in one or more of various ways. Merely by way of example, the imaging device 110 may be connected to the processing device 140 through the network 120. As another example, the imaging device 110 may be connected to the processing device 140 directly as indicated by the bi-directional arrow in dotted lines linking the imaging device 110 and the processing device 140. As a further example, the storage device 150 may be connected to the processing device 140 directly or through the network 120. As still a further example, the terminal 130 may be connected to the processing device 140 directly (as indicated by the bi-directional arrow in dotted lines linking the terminal 130 and the processing device 140) or through the network 120.

The imaging device 110 may generate or provide image data related to a portion of a subject via scanning the subject. In some embodiments, the subject may include a biological subject and/or a non-biological subject. For example, the subject may include a specific portion of a body, such as an organ (e.g., a head, a thorax, an abdomen, etc.), a tissue (e.g., a vessel, a bone, etc.), or the like, or a combination thereof. In some embodiments, the imaging device 110 may include a single-modality scanner (e.g., a CT scanner) and/or multi-modality scanner (e.g., a PET-CT scanner) as described elsewhere in this disclosure. In some embodiments, the image data relating to the subject may include projection data, one or more 2D images of the subject, volume data (e.g., one or more 3D images) of the subject, etc.

In some embodiments, the imaging device 110 may include a gantry 111, a detector 112, a detecting region 113, a scanning table 114, and a radioactive scanning source 115. The gantry 111 may support the detector 112 and the radioactive scanning source 115. The subject may be placed on the scanning table 114 to be scanned. The radioactive scanning source 115 may emit radioactive rays to the subject. The radiation may include a particle ray, a photon ray, or the like, or a combination thereof. In some embodiments, the radiation may include a plurality of radiation particles (e.g., neutrons, protons, electrons, u-mesons, heavy ions), a plurality of radiation photons (e.g., X-ray, a y-ray, ultraviolet, laser), or the like, or a combination thereof. The detector 112 may detect radiations and/or radiation events (e.g., gamma photons) emitted from the detecting region 113. In some embodiments, the detector 112 may include a plurality of detector units. The detector units may include a scintillation detector (e.g., a cesium iodide detector) or a gas detector. The detector unit may be a single-row detector or a multi-rows detector.

The network 120 may facilitate the exchange of information and/or data. In some embodiments, one or more components of the imaging system 100 (e.g., the imaging device 110, the terminal 130, the processing device 140, or the storage device 150) may send information and/or data to another component(s) of the imaging system 100 via the network 120. For example, the processing device 140 may obtain, via the network 120, images and/or data (e.g., 2D images, 3D images, volume, etc.) from the storage device 150. As another example, the processing device 140 may obtain a model (e.g., a preliminary model, a trained model, etc.) from the storage device 150. In some embodiments, the network 120 may be any type of wired or wireless network, or combination thereof. The network 120 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired or wireless network access points such as base stations and/or internet exchange points through which one or more components of the imaging system 100 may be connected to the network 120 to exchange data and/or information.

The terminal 130 may include a mobile device 131, a tablet computer 132, a laptop computer 133, or the like, or any combination thereof. In some embodiments, the mobile device 131 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, eyeglasses, a helmet, a watch, clothing, a backpack, an accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal 130 may remotely operate the imaging device 110. In some embodiments, the terminal 130 may operate the imaging device 110 via a wireless connection. In some embodiments, the terminal 130 may receive information and/or instructions inputted by a user, and send the received information and/or instructions to the imaging device 110 or the processing device 140 via the network 120. In some embodiments, the terminal 130 may receive data and/or information from the processing device 140. In some embodiments, the terminal 130 may be omitted or be part of the processing device 140.

In some embodiments, the processing device 140 may process data obtained from the imaging device 110, the terminal 130, or the storage device 150. For example, the processing device 140 may obtain at least one original image of a tissue. The processing device 140 may determine structure data associated with the tissue and at least one stenosis region of the tissue by processing the at least one original image using an identification model. As another example, the processing device 140 may obtain at least one CPR image of a tissue and determine information associated with the at least one ROI of the tissue in the CPR image and volume data.

In some embodiments, the identification model and training samples for training the identification model may be generated by a processing device of a system different from the imaging system 100 or a server different from the processing device 140 on which the application of the identification model is performed. For instance, the training samples and/or the identification model may be generated by a first system of a vendor who provides and/or maintains such an identification model, while the generation of the structure data and/or the at least one stenosis region based on the provided identification model may be performed on a second system of a client of the vendor. In some embodiments, the application of the identification model may be performed online in response to a request for determining the structure data and/or the at least one stenosis region. In some embodiments, the training samples and/or the identification model may be determined or generated offline.

In some embodiments, the identification model may be determined and/or updated (or maintained) by, e.g., the manufacturer of the imaging device 110 or a vendor. For instance, the manufacturer or the vendor may load the identification model into the imaging system 100 or a portion thereof (e.g., the processing device 140) before or during the installation of the imaging device 110 and/or the processing device 140, and maintain or update the identification model from time to time (periodically or not). The maintenance or update may be achieved by installing a program stored on a storage device (e.g., a compact disc, a USB drive, etc.) or retrieved from an external source (e.g., a server maintained by the manufacturer or vendor) via the network 120. The program may include a new model (e.g., a new identification model) or a portion of a model that substitutes or supplements a corresponding portion of the model.

In some embodiments, the processing device 140 may be a single server or a server group. The server group may be centralized or distributed. For example, the processing device 140 may be a central processing unit (CPU), a digital signal processor (DSP), a system on a chip (SoC), a microcontroller unit (MCU), or the like, or any combination thereof. In some embodiments, the processing device 140 may be local or remote. For example, the processing device 140 may access information and/or data stored in the imaging device 110, the terminal 130, and/or the storage device 150 via the network 120. As another example, the processing device 140 may be directly connected to the imaging device 110, the terminal 130, and/or the storage device 150, to access stored information and/or data. In some embodiments, the processing device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 140 may be implemented on a computing device 200 having one or more components illustrated in FIG. 2 in the present disclosure.

The storage device 150 may store data and/or instructions. In some embodiments, the storage device 150 may store data obtained from the terminal 130 and/or the processing device 140. For example, the storage device 150 may store one or more images/data obtained from the processing device 140 and/or the imaging device 110. As another example, the storage device 150 may store a model (e.g., a preliminary model, a trained model, etc.). In some embodiments, the storage device 150 may store data and/or instructions that the processing device 140 may execute or use to perform exemplary methods described in the present disclosure. For example, the storage device 150 may store data and/or instructions that the processing device 140 may execute or use to determine structure data and/or at least one stenosis region. As another example, the storage device 150 may store data and/or instructions that the processing device 140 may execute or use to determine information or parameter associated with at least one portion of the tissue.

In some embodiments, the storage device 150 may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components of the imaging system 100 (e.g., the terminal 130, the processing device 140). One or more components of the imaging system 100 may access the data or instructions stored in the storage device 150 via the network 120. In some embodiments, the storage device 150 may be directly connected to or communicate with one or more components of the imaging system 100 (e.g., the terminal 130, the processing device 140). In some embodiments, the storage device 150 may be part of the processing device 140.

In some embodiments, a coordinate system may be provided for the imaging system 100 to define a position of a component and/or the subject (e.g., an absolute position, a position relative to another component). For illustration purposes, the coordinate system 160 may include the X-axis, the Y-axis, and the Z-axis. The X-axis and the Y-axis shown in FIG. 1 may be horizontal, and the Z-axis may be vertical. As illustrated, a positive X direction along the X-axis may be from the left side to the right side of the scanning table 114 viewed from the direction facing the front of the medical imaging device 110; a positive Y direction along the Y-axis may be the direction in which the scanning table 114 is moved from the imaging system 100 to the outside viewed from the direction facing the front of the medical imaging device 110, and a positive Z direction along the Z-axis may be from the lower part (or from the floor where the imaging system 100 stands) to the upper part of the gantry 111.

It should be noted that the above description of the imaging system 100 is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the imaging system 100 may include one or more additional components. Additionally or alternatively, one or more components of the imaging system 100 described above may be omitted. As another example, two or more components of the imaging system 100 may be integrated into a single component.

Figure 2:
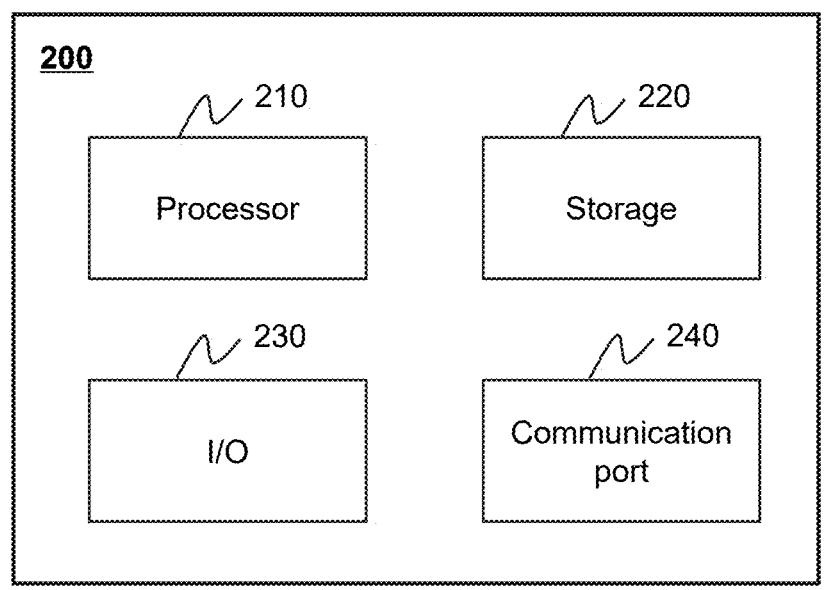
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. The computing device 200 may be used to implement any component of the imaging system 100 as described herein. For example, the processing device 140 and/or the terminal device 130 may be implemented on the computing device 200, respectively, via its hardware, software program, firmware, or a combination thereof. Although only one such computing device is shown, for convenience, the computer functions relating to the imaging system 100 as described herein may be implemented in a distributed fashion on a number of similar platforms, to distribute the processing load.

As illustrated in FIG. 2, the computing device 200 may include a processor 210, a storage 220, an input/output (I/O) 230, and a communication port 240.

The processor 210 may execute computer instructions (program code) and, when executing the instructions, cause the processing device 140 to perform functions of the processing device 140 in accordance with techniques described herein. The computer instructions may include, for example, routines, programs, objects, components, signals, data structures, procedures, modules, and functions, which perform particular functions described herein. In some embodiments, the processor 210 may process data and/or images obtained from the imaging device 110, the terminal device 130, the storage device 150, and/or any other component of the imaging system 100. For example, the processor 210 may obtain at least one original image of at least one portion of an object from the storage device 150.

In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes process A and a second processor executes process B, or the first and second processors jointly execute operations A and B).

The storage 220 may store data/information obtained from the imaging device 110, the terminal device 130, the storage device 150, or any other component of the imaging system 100. In some embodiments, the storage 220 may include a mass storage device, a removable storage device, a volatile read-and-write memory, a read-only memory (ROM), or the like, or any combination thereof. In some embodiments, the storage 220 may store one or more programs and/or instructions to perform exemplary methods described in the present disclosure.

The I/O 230 may input or output signals, data, and/or information. In some embodiments, the I/O 230 may enable user interaction with the processing device 140. In some embodiments, the I/O 230 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 240 may be connected to a network (e.g., the network 160) to facilitate data communications. The communication port 240 may establish connections between the processing device 140 and the imaging device 110, the terminal device 130, or the storage device 150. The connection may be a wired connection, a wireless connection, or a combination of both that enables data transmission and reception. The wired connection may include an electrical cable, an optical cable, a telephone wire, or the like, or any combination thereof. The wireless connection may include Bluetooth, Wi-Fi, WiMAX, WLAN, ZIGBEE, mobile network (e.g., 3G, 4G, or 5G), or the like, or a combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
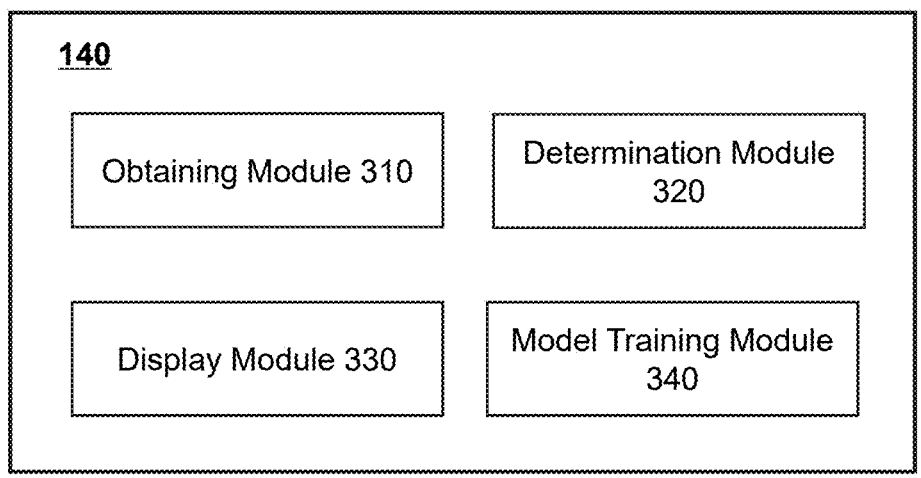
FIG. 3 is block diagrams illustrating an exemplary processing device according to some embodiments of the present disclosure.

FIG. 3 is a block diagram illustrating an exemplary processing device according to some embodiments of the present disclosure. The processing device 140 may include an obtaining module 310, a determination module 320, a display module 330, and a model training module 340.

The obtaining module 310 may be configured to obtain at least one image associated with a tissue. The at least one image associated with the tissue may include at least one original image of the tissue, a plurality of training images, a plurality of reference images, volume data, etc. In some embodiments, the obtaining module 310 may obtain information associated with the at least one image, a relationship between two or more images of the at least one image associated with the tissue, etc. For example, the obtaining module 310 may obtain first position information associated with at least one ROI of the tissue based on at least one CPR image determined by the determination module 320. As another example, the obtaining module 310 may obtain a first mapping relationship between the CPR image and volume data associated with the tissue. As yet another example, the obtaining module 310 may obtain a second mapping relationship between pixels of a CPR image and voxels of the volume data associated with the tissue.

In some embodiments, the determination module 320 may be configured to determine structure data associated with the tissue. The determination module 320 may determine raw data associated with a tissue based on at least one original image of the tissue. The determination module 320 may determine a target region in the at least one original image of the tissue using an identification model. The determination module 320 may determine the structure data associated with the tissue based on the raw data and the target region. In some embodiments, the determination module 320 may be configured to determine at least one stenosis region of the tissue. The determination module 320 may determine radial information associated with at least one portion of the tissue, determine whether the radial information associated with the portion of the tissue satisfies a preset condition, and further determine that the portion of the tissue corresponds to the stenosis region of the at least one portion of the tissue in response to that the portion of the tissue satisfies the preset condition. More descriptions regarding the determination of the structure data and the at least one stenosis region may be found elsewhere in the present disclosure. See, e.g., FIG. 5 and FIG. 7 and the relevant descriptions thereof.

The display module 330 may be configured to display at least one information and/or data determined by the determination module 320. For example, the display module 330 may display the at least one of the structure data and/or the at least one stenosis region of the tissue. As another example, the display module 330 may display at least one portion of at least one parameter associated with the at least one ROI of the tissue. The at least one parameter associated with the at least one ROI of the tissue may include a diameter (e.g., a maximum diameter, a minimum diameter, etc.), a volume, a gray value, an average gray value, an area, a shape, etc. of the at least one ROI. In some embodiments, the display module 330 may display the information and/or data in various forms, e.g., in the CPR image, the volume data, etc.

The model training module 340 may be configured to generate the identification model by training a preliminary identification model using the plurality of training images. In some embodiments, the training images may be labeled with a second region. The second region may be determined by registering the plurality of reference images labeled with first regions with the training images corresponding to the plurality of reference images. More descriptions regarding the training of the identification model may be found elsewhere in the present disclosure. See, e.g., FIG. 6 and the relevant descriptions thereof.

The modules in the processing device 140 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the determination module 320 may be divided into a structure data determine unit configured to determine the structure data, a stenosis region determination unit configured to determine the at least one stenosis region, and a CPR image determination unit configured to determine the CRP image. As another example, the determination module 320 and the model training module 340 may be combined as a single module which may be configured to perform the functions thereof.

Figure 4:
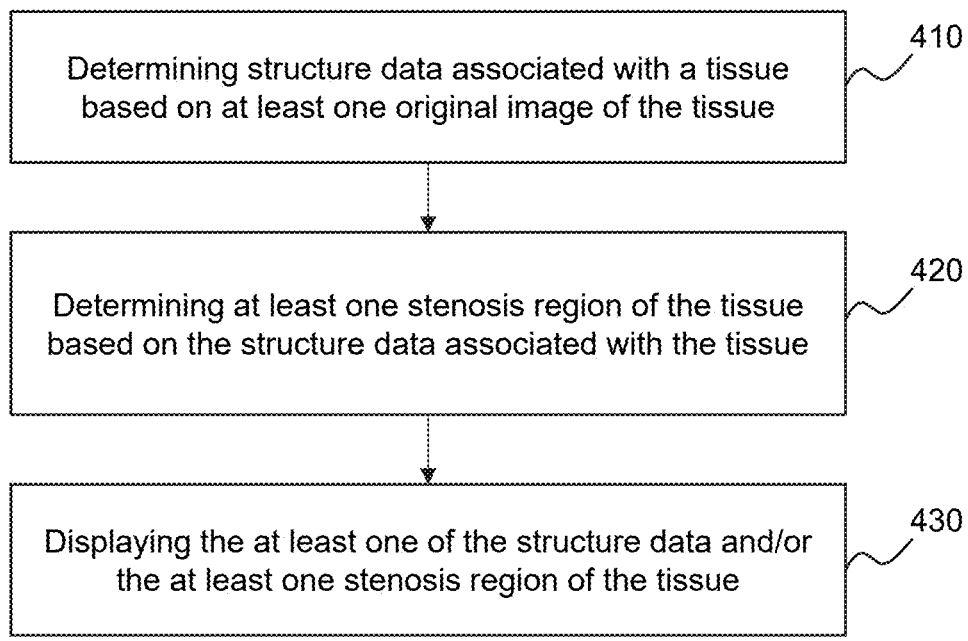
FIG. 4 is a flowchart illustrating an exemplary process for determining structure data and/or at least one stenosis region of a tissue according to some embodiments of the present disclosure.

FIG. 4 is a flowchart illustrating an exemplary process for determining structure data and/or at least one stenosis region of a tissue according to some embodiments of the present disclosure. In some embodiments, one or more operations of process 400 illustrated in FIG. 4 may be implemented in the imaging system 100 illustrated in FIG. 1. For example, the process 400 may be stored in a storage device (e.g., the storage device 150 and/or the storage 220) of the imaging system 100 in the form of instructions, and invoked and/or executed by the processing device 140 (e.g., the processor 210, or one or more modules illustrated in FIG. 3). The operations of the illustrated process presented below are intended to be illustrative. In some embodiments, the process 400 may be accomplished with one or more additional operations not described and/or without one or more of the operations discussed. Additionally, the order in which the operations of the process as illustrated in FIG. 4 and described below is not intended to be limiting.

In 410, the processing device 140 (e.g., the determination module 320) may determine structure data associated with a tissue based on at least one original image of the tissue.

In some embodiments, a tissue refers to at least one portion of an object. The object may include a biological object and/or a non-biological object. For example, the object may be a patient, and the tissue may be the vessel, the heart, the abdomen, the head, the thorax, the breast, the nerve, the bone, etc., of the patient.

In some embodiments, the at least one original image may include a medical image generated by a biomedical imaging technique as described elsewhere in this disclosure. For example, the at least one original image may include a CT image, an MRI image, an X-ray image, a PET image, an OCT image, a US image, an IVUS image, a NIRS image, etc. In some embodiments, the at least one original image may include an image by performing a scan on the tissue which is injected with a contrast agent. As used herein, the contrast agent may be used to enhance the contrast of structures of the tissue in an image. Exemplary contrast agents may include iodine-based compounds, barium-sulfate compounds, etc.

In some embodiments, the processing device 140 may generate the at least one original image by processing at least one image associated with the tissue. The processing of the image may include a denoising operation, an enhancement operation, a smoothing operation, a fusion operation, a segmentation operation, a registration operation, a transformation operation, or the like, or a combination thereof. For example, the image may be an image of the heart of a patient. The processing device 140 may segment the coronary artery of the patient from the image, and designate the segmented region as an original image of the tissue. As another example, the processing device 140 may reconstruct the at least one original image by processing the at least one images associated with the tissue. The reconstructed image may include a multiplanar reconstruction (MPR) image, a curved planar reconstruction (CPR) image, a three-dimensional (3D) rendering image, or the like.

In some embodiments, the processing device 140 may obtain the at least one original image from one or more components of the imaging system 100. For example, the processing device 140 may obtain the at least one original image from the imaging device 110. As another example, the processing device 140 may obtain the at least one original image from a storage device (e.g., the storage device 150 or the storage 220) of the imaging system 100 via a network (e.g., the network 160). Alternatively or additionally, the processing device 140 may obtain the at least one original image from an external source (e.g., a medical database) via a network (e.g., the network 160).

In some embodiments, the structure data associated with the tissue refers to data that indicates a structure of the tissue. The structure data associated with the tissue may include data associated with the tissue, for example, data of a centerline, a boundary line, a diameter, a shape, a length, a cross section of the tissue, etc. In some embodiments, the structure data may include 2D data (e.g., 2D image), 3D data (e.g., volume data), or the like, or any combination thereof. In some embodiments, the structure data may be represented by various types, for example, a coordinate, a text description, an audio description, a graphical illustration, etc.

In some embodiments, the processing device 140 may determine the structure data based on various approaches. For example, the processing device 140 may extract the structure data from the at least one original image based on an image segmentation algorithm. Exemplary image segmentation algorithm may include a threshold-based segmentation algorithm, an edge-based segmentation algorithm, a region-based segmentation algorithm, a clustering-based algorithm, an image segmentation algorithm based on wavelet transform, an image segmentation algorithm based on mathematical morphology, and an image segmentation algorithm based on artificial neural network, or the like, or any combination thereof.

In some embodiments, the processing device 140 may determine the structure data from raw data including the structure data. More descriptions regarding the determination of structure data based on raw data may be found elsewhere in the present disclosure. See, e.g., FIG. 5 and the relevant descriptions thereof.

In 420, the processing device 140 (e.g., the determination module 320) may determine at least one stenosis region of the tissue based on the structure data associated with the tissue.

As used herein, a stenosis region refers to a region of a tissue (e.g., a tubular tissue), which may be with an abnormal narrowing. For example, the stenosis region may include a stenosis region of a vessel (e.g., the peripheral artery, the coronary artery, the carotid artery, etc.), a stenosis region of a pyloric, a stenosis region of a valve, a spinal stenosis region, etc. In some embodiments, a contraction (e.g., the muscle, etc.), a lesion (e.g., a plaque, fat, etc.), or the like, of the tissue may reduce the space of a region of the tissue and form the stenosis region.

In some embodiments, the processing device 140 may determine the at least one stenosis region based on various approaches. For example, the processing device 140 may determine a tissue model representing the tissue based on the at least one original image of the tissue. Based on the model representing the tissue, the processing device 140 may determine the stenosis region of the tissue. As another example, the processing device 140 may determine the stenosis region of the tissue by comparing the at least one original image of the tissue with at least one reference image of a reference tissue. The reference tissue refers to a tissue that may not have a stenosis region, and a type of the reference tissue may be the same as that of the tissue. Merely by way of example, assumed that the tissue is the coronary artery, the stenosis region of the tissue may be the region of the coronary artery with a plaque, and the reference tissue may be a coronary artery with no stenosis region or a coronary artery on which the plaque is removed. As yet another example, the processing device 140 may determine the stenosis region using a machine learning model. The machine learning model may include a neural network model or other models. The processing device 140 may input the at least one original image of the tissue into the machine learning model, and the machine learning model may output the stenosis region (or a position of the stenosis region) of the tissue. In some embodiments, the machine learning model may be trained using a plurality of training samples. The training samples may include exemplary inputs for the machine learning model and labels that indicate desired outputs corresponding to the exemplary inputs.

In some embodiments, the processing device 140 may determine the stenosis region of the tissue based on radial information associated with at least one portion of the tissue. More descriptions regarding the determination of the stenosis region may be found elsewhere in the present disclosure. See, e.g., FIG. 7 and the relevant descriptions thereof.

In 430, the processing device 140 (e.g., the display module 330) may display the at least one of the structure data and/or the at least one stenosis region of the tissue.

In some embodiments, the processing device 140 may display the structure data and/or the at least one stenosis region of the tissue in various forms, for example, a graphical illustration, a text description, a voice description, an audio description, etc. In some embodiments, the processing device 140 may display the structure data and the stenosis region in different forms (e.g., different colors, different types). For example, the processing device 140 may display the structure data in a greyscale form and display the at least one stenosis region of the tissue in colors.

In some embodiments, the processing device 140 may transmit the structure data and/or the at least one stenosis region of the tissue to one or more components of the imaging system 100 to store or display. For example, the processing device 140 may transmit the structure data and/or the at least one stenosis region of the tissue to the storage device 150, the storage 220, or other storage devices to store. As another example, the processing device 140 may transmit the at least one stenosis region of the tissue to a display device (e.g., the terminal 130, the I/O 230, etc.) for display. In some embodiments, the structure data and/or the at least one stenosis region of the tissue in the at least one original image, such as a volume rendering (VR) image, a multiplanar reformation (MPR) image, a CPR image, or the like, or any combination thereof, of the tissue.

It should be noted that the above description regarding the process 400 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 5:
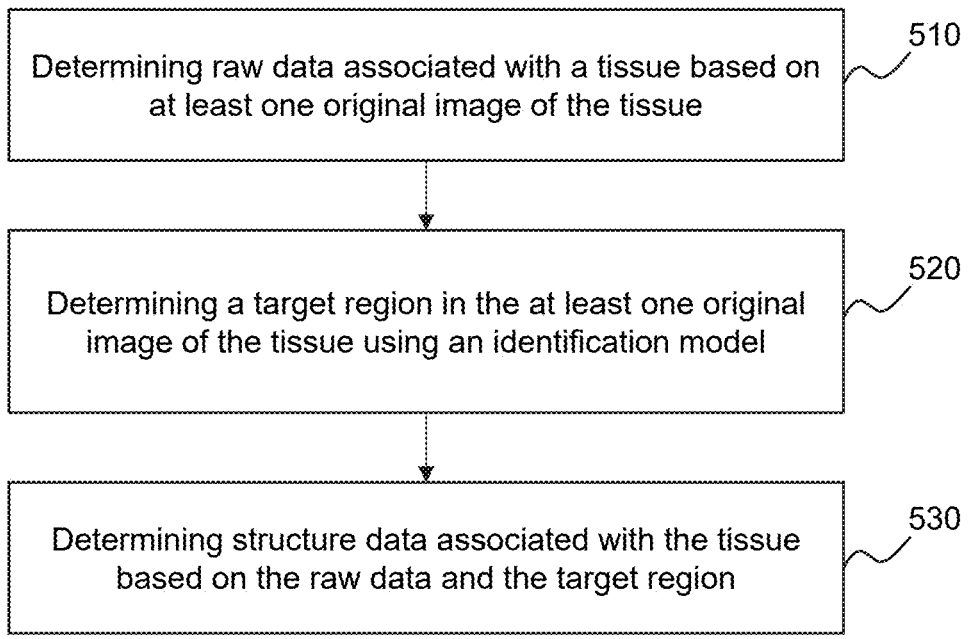
FIG. 5 is a flowchart illustrating an exemplary process for determining structure data associated with a tissue according to some embodiments of the present disclosure.

FIG. 5 is a flowchart illustrating an exemplary process for determining structure data associated with a tissue according to some embodiments of the present disclosure. In some embodiments, process 500 may be an exemplary embodiment of the operation 410 as described in connection with FIG. 4. In some embodiments, one or more operations of process 500 illustrated in FIG. 5 may be implemented in the imaging system 100 illustrated in FIG. 1. For example, the process 500 may be stored in a storage device (e.g., the storage device 150, and/or the storage 220) of the imaging system 100 in the form of instructions, and invoked and/or executed by the processing device 140 (e.g., the processor 210, or one or more modules illustrated in FIG. 3). The operations of the illustrated process presented below are intended to be illustrative. In some embodiments, the process 500 may be accomplished with one or more additional operations not described and/or without one or more of the operations discussed. Additionally, the order in which the operations of the process as illustrated in FIG. 5 and described below is not intended to be limiting.

In 510, the processing device 140 (e.g., determination module 320) may determine raw data associated with a tissue based on at least one original image of the tissue.

As used herein, the raw data refers to data that may include structure data associated with the tissue and/or data of one or more anomalies. In some embodiments, the data associated with one or more anomalies may affect the determination of the structure data associated with the tissue. For example, the data of the one or more anomalies may overlap with the data associated with the tissue. As another example, the data associated with the one or more anomalies may be easily regarded as the structure data. An exemplary anomaly may include fat tissue, a stent, a plaque, other tissues, or the like, or any combination thereof. For example, assuming that the tissue is the coronary artery of a patient, the one or more anomalies may include a stent and a plaque on the coronary artery, the raw data may include structure data associated with the coronary artery and the data of the stent and/or the plaque. In some embodiments, the raw data associated with the tissue may include a CT value, a gray value, position information of one or more points (or pixels), or the like, or any combination thereof.

In some embodiments, the processing device 140 may determine the raw data based on one or more algorithms. Exemplary algorithms may include a threshold-based segmentation algorithm, an edge-based segmentation algorithm, a region-based segmentation algorithm, a clustering-based algorithm, an image segmentation algorithm based on wavelet transform, an image segmentation algorithm based on mathematical morphology, and an image segmentation algorithm based on artificial neural network, or the like, or any combination thereof.

For illustration purposes, a determination of raw data associated with a coronary artery based on at least one coronary angiographic image may be taken as an example to illustrate the determination of the raw data. The processing device 140 may determine a coronary artery tree based on the at least one coronary angiographic image using a regional growing algorithm and determine the raw data of the coronary artery based on the coronary artery tree. Specifically, the processing device 140 may determine at least one seed point in the at least one coronary angiographic image, and usually more than two, which may form a line along the artery. As used herein, a seed point may refer to an image pixel/voxel inside a tissue in an image. For example, the seed point may be an image pixel/voxel close to a center of the at least one coronary angiographic image. In some embodiments, the coronary tree may be divided into a left coronary artery and a right coronary artery, and two or more seed points corresponding to the left coronary artery and the right coronary artery may be determined.

In some embodiments, the processing device 140 may determine the at least one seed point from the at least one coronary angiographic image using a template matching technology, a deep learning technology, a gradient descent algorithm, a threshold algorithm, a regional growth algorithm, a level set algorithm, region segmentation and/or merging, an edge tracking segmentation algorithm, a statistical pattern recognition algorithm, a mean clustering segmentation algorithm, a manual calibration algorithm, a topology refinement algorithm, a distance transformation algorithm, or the like, or any combination thereof. etc. For example, the processing device 140 may obtain at least one pre-determined template image with an annotated coronary artery, e.g., from the storage device 150, the storage 220, or an external storage device. The processing device 140 may register the at least one coronary angiographic image with the at least one template image to determine position information associated with the coronary artery on the at least one coronary angiographic image. The position information associated with the coronary artery may include a position of the coronary artery, a position of an opening of the coronary artery, or the like, or any combination thereof. The processing device 140 may determine the at least one seed point based on the position information associated with the coronary artery on the at least one template image. As another example, the processing device 140 may input the at least one coronary angiographic image into a seed point extraction model, and the seed point extraction model may output the at least one seed point. The seed point extraction model may be trained using a plurality of samples each of which is labeled with at least one seed point (e.g., an opening of a coronary artery) using a deep learning technology, thereby further improving the determination accuracy of the seed points.

The processing device 140 may determine the coronary artery tree based on the determined seed point using a region growth algorithm, a level set algorithm, etc. For example, the processing device 140 may determine a growth threshold such as a contrast threshold, a gray threshold, or the like, or any combination thereof. The processing device 140 may start the region growth from the seed point based on the growth threshold and obtain the extracted coronary artery tree after the region growth is completed. After the coronary artery tree is extracted, the skeletal algorithm, the level set algorithm, etc. may be used to extract the coronary artery centerline.

Based on the determined coronary artery tree, the processing device 140 may determine a plurality of centerlines of the coronary artery. A centerline refers to a line along each of the vessels of the coronary artery and located inside the vessel of the coronary artery. In some embodiments, a centerline of a vessel may refer to a collection of pixels located in or close to a central area of the vessel. In some embodiments, a centerline of a vessel may refer to a line connecting pixels with an equal distance or substantially equal distance to a boundary of the vessel. In some embodiments, the processing device 140 may determine the centerline of the vessels e.g., using a skeleton algorithm, a snake algorithm, a level set algorithm, etc.

The processing device 140 may determine a centerline tree of the coronary artery and designate the centerline tree of the coronary artery as the raw data of the coronary artery.

Alternatively, the processing device 140 may name the plurality of centerlines of the vessels of the coronary artery after the plurality of centerline are determined, thereby improving the determination efficiency of the structure data and/or at least one stenosis region of the coronary artery in a subsequent process. On the basis of the coronary centerline tree, the centerline of each vessel of the coronary artery may be named. The vessels of the coronary artery may include the left main coronary artery, the left anterior descending branch, the left circumflex branch, the left diagonal branch, the left obtuse marginal branch, the right coronary artery, the right descending branch, etc. Alternatively or additionally, the processing device 140 may name the vessels of the coronary artery using a centerline template matching approach, a machine learning approach, etc. For example, a plurality of sample centerlines may be annotated (manually, automatically, or semi-automatically) in at least one sample original image associated with the coronary artery. The processing device 140 may average the plurality of annotated centerlines on the at least one sample original image associated with the coronary artery and generate the centerline template based on the averaged centerlines. The processing device 140 may match the centerline template and the centerlines of the vessels of the coronary artery e.g., using a point registration approach, and designate the name of a sample centerline on the centerline template, which may be relatively close to the centerline of the vessel of the coronary artery, as the name of the centerline of the vessel of the coronary artery. By naming the centerline of the vessel of the coronary artery, the error that may exist during the determination of the structure data can be reduced, thereby improving the determination accuracy of the structure data.

In some embodiments, the processing device 140 may name the centerlines of the vessels of the coronary artery using a machine learning method, thereby improving name accuracy of the centerlines of the vessels of the coronary artery. Specifically, the processing device 140 may input the centerlines of the coronary artery into a centerline naming model, and the centerline naming model may output the names of the centerlines of the coronary artery. In some embodiments, the centerline naming model may be generated by training a preliminary centerline naming model using a plurality training samples. The plurality of training samples may be determined based on a centerline parameter and the centerline names corresponding to the centerline template. The centerline parameter may include a characteristic parameter of the centerline of each vessel of the coronary artery in the coronary centerline template, such as a length of the centerline, an angle of the centerline, etc. The processing device 140 may determine the centerline tree with names as the raw data of the coronary artery. The use of the centerline naming model may further improve the determination accuracy of the determination of the coronary artery.

In 520, the processing device 140 (e.g., the determination module 320) may determine a target region in the at least one original image of the tissue using an identification model.

The target region may refer to an entire or a portion of a region representing the one or more anomalies in the at least one original image of the tissue.

In some embodiments, the identification model refers to a model (e.g., a machine learning model) or an algorithm for determining a target region in the at least one original image of the tissue. For example, the processing device 140 may input the at least one original image into the identification model, and the identification model may output the target region in the at least one original image. In some embodiments, the input and/or output of the identification model may include image data, vectorized data, etc.

In some embodiments, the identification model may include a V-net model, a U-net model, an AlexNet model, an Oxford Visual Geometry Group (VGG) model, a ResNet model, a deep neural network (DNN) model, a multi-layer perceptron (MLP) model, a conventional neural network (CNN) model, a generative adversarial network (GAN) model, a deep convolutional encoder-decoder (DCED) network model, or the like, or any combination thereof.

In some embodiments, the identification model may be predetermined by a computing device (e.g., the processing device 140 or a computing device of a vendor of the identification model) and stored in a storage device (e.g., the storage device 150, the storage 220, or an external source). The processing device 120 may obtain the identification model from the storage device. In some embodiments, the identification model may be a trained model generated by a computing device (e.g., the processing device 140) by performing a process (e.g., process 600) for generating the identification model disclosed herein. More descriptions regarding the training of the identification model may be found elsewhere in the present disclosure. See, e.g., FIG. 6 and relevant descriptions thereof.

In 530, the processing device 140 (e.g., the determination module 320) may determine the structure data associated with the tissue based on the raw data and the target region.

In some embodiments, the processing device 140 may determine the structure data via various manners. For example, the processing device 140 may subtract the target region from the raw data and determine the structure data by performing a subtraction operation between the raw data and the target region. During the subtraction operation, data (e.g., gray values) of corresponding pixels/voxels in raw data and the target region may be subtracted. As used herein, a pixel/voxel of an image may be referred to as corresponding to a pixel/voxel of another image when the pixels/voxels of the two images correspond to the same physical location or spot of a subject represented in the images. Specifically, the processing device 140 may remove the pixels (or voxels) corresponding to the pixels (or voxels) in the target region from the raw data, and designate the subtracted result as the structure data.

It should be noted that the above description regarding the process 500 is merely provided for the purposes of illustration, and not intended to limit the scope of the present disclosure. For persons having ordinary skills in the art, multiple variations and modifications may be made under the teachings of the present disclosure.

In some embodiments, one or more other optional operations (e.g., a display operation) may be added elsewhere in the process 500. In the display operation, the information and/or data (e.g., the raw data, the target region, the structure data) may be transmitted to a display device to display on the same interface. The user may adjust the information and/or data by sending an adjusting instruction, and the processing device 140 may adjust the information and/or data based on the instruction of the user.

Alternatively, to improve the determination accuracy of the coronary artery tree, the coronary angiographic image may be enhanced to obtain an enhanced coronary angiographic image. The processing device 140 may enhance the coronary angiographic image based on various approaches. For example, the processing device 140 may enhance the coronary angiographic image using a Hessian matrix line enhancement approach, a deep learning algorithm, etc. Merely by way of example, the processing device 140 may input the coronary angiographic image into an enhancement model, and the enhancement model may output an enhanced coronary angiographic image. In some embodiments, the enhancement model may be trained using a plurality of training sample coronary angiographic images and sample enhanced coronary angiographic images corresponding to the sample coronary angiographic images. However, those variations and modifications do not depart from the scope of the present disclosure.

Figure 6:
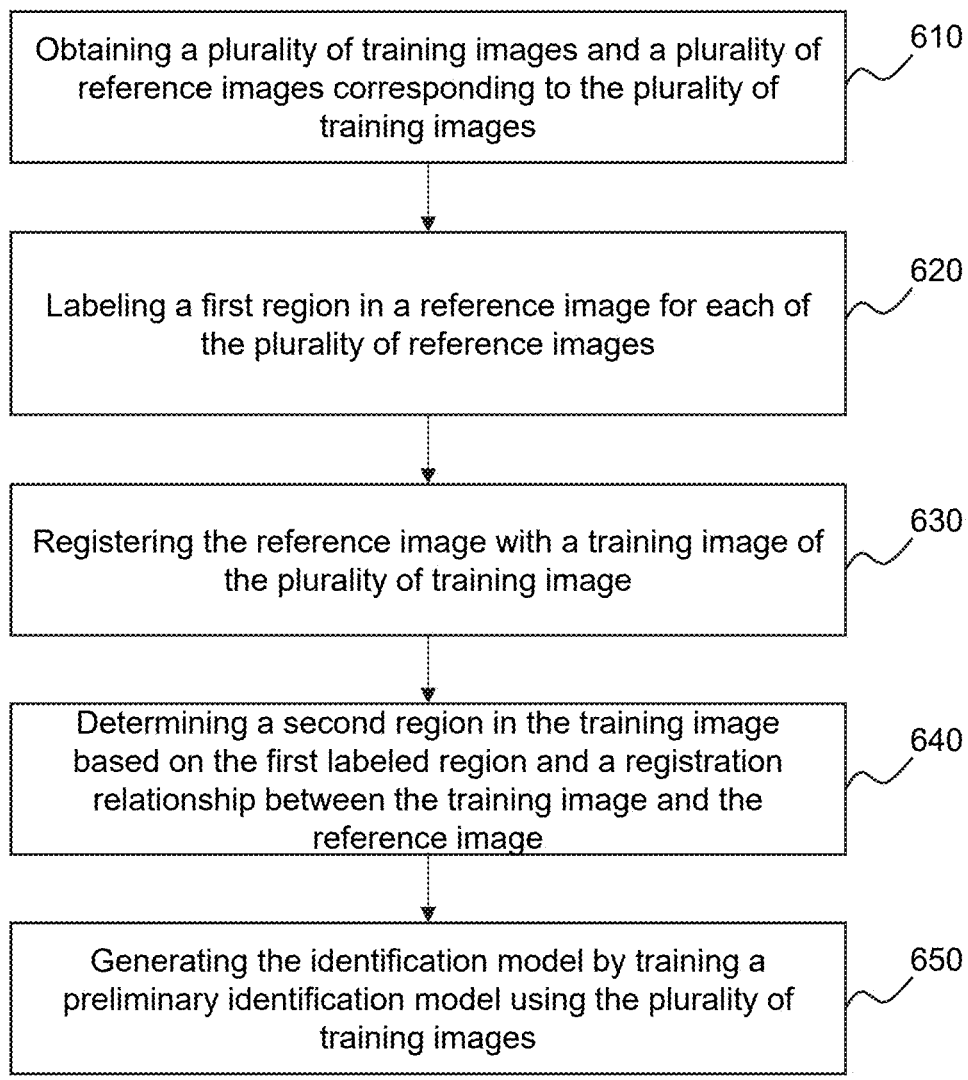
FIG. 6 is a flowchart illustrating an exemplary process for training an identification model according to some embodiments of the present disclosure.

FIG. 6 is a flowchart illustrating an exemplary process for training an identification model according to some embodiments of the present disclosure. In some embodiments, process 600 may be an exemplary embodiment of the operation 520 as described in connection with FIG. 5. In some embodiments, one or more operations of process 600 illustrated in FIG. 6 may be implemented in the imaging system 100 illustrated in FIG. 1. For example, the process 600 may be stored in a storage device (e.g., the storage device 150, and/or the storage 220) of the imaging system 100 in the form of instructions, and invoked and/or executed by the processing device 140 (e.g., the processor 210, or one or more modules illustrated in FIG. 3). The operations of the illustrated process presented below are intended to be illustrative. In some embodiments, the process 600 may be accomplished with one or more additional operations not described and/or without one or more of the operations discussed. Additionally, the order in which the operations of the process as illustrated in FIG. 6 and described below is not intended to be limiting.

In 610, the processing device 140 (e.g., the model training module 340) may obtain a plurality of training images and a plurality of reference images corresponding to the plurality of training images.

In some embodiments, each of the plurality of training images may include an image of a sample tissue captured by an imaging device (e.g., the imaging device 110). The sample tissue of a training sample may be of the same type as or a different type from the tissue as described in connection with operation 520. For example, the tissue may be the coronary artery of a patient, and the sample tissue may be the coronary artery of other patients. The plurality of training images may be of the same type as or a different type from the at least one original image as described in connection with operation 520. Two images may be deemed as belonging to the same type if they are acquired by the same imaging modality.

In some embodiments, each of the plurality of training images and a reference image corresponding to the training image may present the same (or substantially same) sample tissue. In some embodiments, the plurality of reference images corresponding to the plurality of training images may be acquired in the same or different conditions. The condition may include one or more scanning parameters of the imaging device, a condition associated with the sample subject, an imaging environment, or the like, or any combination thereof. For example, the plurality of training images may be acquired under a relatively less radiation dose, and the plurality of reference images may be acquired under a relatively more radiation dose.

In some embodiments, the plurality of training images may be captured when the sample tissue is injected with a contrast agent, and the plurality of reference images may be captured when the sample subject is not injected with a contrast agent or the sample subject has discharged the contrast agent. In this case, data associated with one or more anomalies (e.g., a plaque, a stent, etc.) may overlap with the structure data associated with the sample tissue. For example, a CT value of the one or more anomalies in the training image may (or substantially) overlap with a CT value of the sample tissue in the training image. In a reference image corresponding to the training image, data associated with one or more anomalies (e.g., a plaque, a stent, etc.) may be relatively easy to be identified with structure data associated with the sample tissue because a CT value difference between the CT value of the one or more anomalies and the CT value of the sample tissue may be relatively large.

In some embodiments, the type of the plurality of training images may be the same as or different from that of the plurality of reference images. For example, the plurality of training images may include a plurality of color images, and the plurality of reference images may include a plurality of grayscale images.

In some embodiments, the plurality of training images and the plurality of reference images may be captured by an imaging device and stored in a storage device (e.g., the storage device 150 and/or the storage device 220 of the imaging system 100). The processing device 140B may obtain the plurality of training images and the plurality of reference images from the storage device.

Alternatively, the plurality of training images and the plurality of reference images may be generated by the processing device 140. Merely by way of example, the processing device 140 may obtain a plurality of preliminary training images and a plurality of preliminary reference images of a plurality of sample tissues. The processing device 140 may further generate the plurality of training images and the plurality of reference images by processing the plurality of preliminary training images and the plurality of preliminary reference images, respectively. The processing of the plurality of preliminary training images and/or reference images may include a denoising operation, an enhancement operation, a smoothing operation, a fusion operation, a segmentation operation, a registration operation, a transformation operation, or the like, or a combination thereof.

In 620, the processing device 140 (e.g., the model training module 340) may label a first region in a reference image for each of the plurality of reference images.

The first region refers to a region representing the one or more anomalies in the reference image. In some embodiments, the first region may be presented in various forms, for example, a connected region, a disconnected region, a boundary, a filled region, a point, a line, a bounding box, a highlighted region, or other forms.

In some embodiments, the first region may be labeled in the reference image manually, semi-automatically, or automatically. For example, a user may label the first region in the reference image via a user interface implemented on the terminal device 130. As another example, the processing device 140 may label the first region in the image automatically without user intervention. The automatic label of the first region may be performed according to an image analysis technique (e.g., an image segmentation algorithm, an object recognition algorithm), a machine learning based technique (e.g., a trained neural network model for the first region label), or the like, or any combination thereof. As yet another example, the first region may be determined semi-automatically by the processing device 140 with user intervention. For example, a user may provide a parameter relating to a parameter relating to the image analysis technique and/or a position parameter relating to a first region. As another example, the user may make an adjustment to or confirm a preliminary first region label performed by the processing device 140.

In 630, the processing device 140 (e.g., the model training module 340) may register each of the plurality of reference images with a training image corresponding to the reference image.

As used herein, image registration is a process of transforming the spatial information of different images into a common coordinate system in order to, e.g., compare or integrate the data obtained from the different images. By performing the registration between the reference image and the training image, the processing device 140 may determine a registration relationship between the reference image and the training image. The registration relationship may include a spatial relationship between the reference image and the training image. Take a specific point (e.g., a pixel) in the reference image as an example, the processing device 140 may determine a corresponding point in the training image, which may represent the same physical point as the point in the reference image.

In some embodiments, the processing device 140 may register the reference image and the training image based on at least one image feature of the reference image and at least one image feature of the training image according to one or more image registration algorithms. The image feature may include a grayscale feature, a gradient feature, an edge feature, a texture feature, a point feature, a line feature, a region feature, a local feature, a global feature, or the like, or any combination thereof. Exemplary image registration algorithms may include an intensity-based algorithm, a feature-based algorithm, a transformation model algorithm (e.g., a linear transformation model, a non-rigid transformation model), a spatial domain algorithm, a frequency domain algorithm, a single-modality algorithm, a multi-modality algorithm, an automatic algorithm, and an interactive algorithm, or the like, or any combination thereof.

Alternatively, the processing device 140 may determine a registration confidence level between the reference image and the training image. A registration confidence level may refer to a reliability level of the registration between the reference image and the training image. The registration confidence level may have a value between 0 and 1.

In 640, the processing device 140 (e.g., the model training module 340) may determine a second region in the training image based on the first labeled region and a registration relationship between the training image and the reference image.

Figure 8:
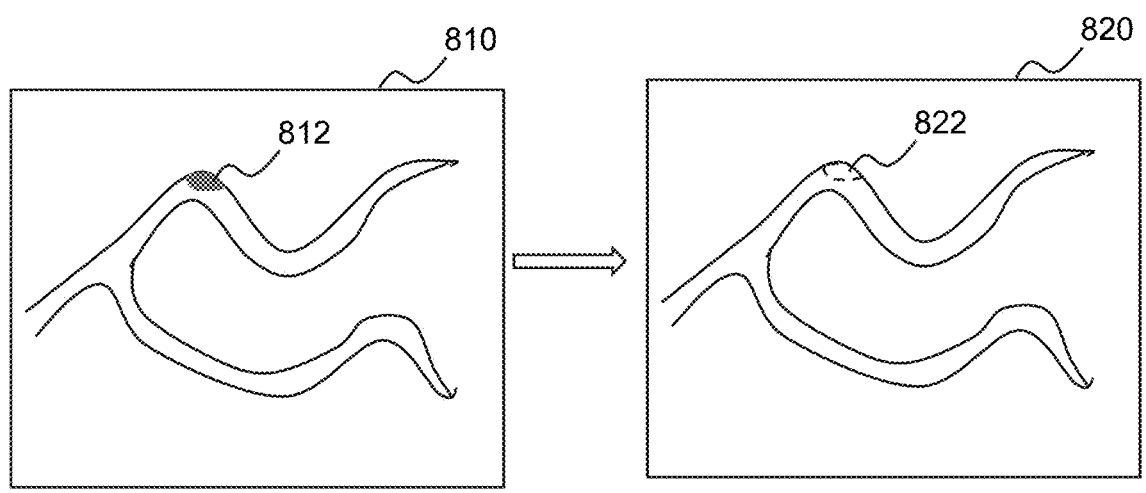
FIG. 8 is schematic diagrams illustrating an exemplary reference image and an exemplary training image of a vessel according to some embodiments of the present disclosure.

The second region refers to a region in the training image, which may correspond to the first labeled region in the reference image and represent the one or more anomalies in the training image. For illustration purposes, FIG. 8 is schematic diagrams illustrating an exemplary reference image and an exemplary training image of a vessel according to some embodiments of the present disclosure. As shown in FIG. 8, 810 refers to the reference image of the vessel of a patient, and 820 refers to the training image of the vessel. The reference image 810 may be with a first region 812 which may be labeled with a connected region. The first region 812 may represent a lesion region on the vessel. A second region 822 represented by a dotted box may be determined on the vessel in the training image 820, which may represent the same lesion region of the vessel as the first region 812.

In some embodiments, the second region may be presented in various form, for example, a connected region, a disconnected region, a boundary, a filled region, a point, a line, a bounding box, a lighted region, etc., which may be the same as or different from the form of the first region.

In some embodiments, the processing device 140 may determine the second region in the training image based on various approaches. For example, the processing device 140 may determine a contour (e.g., one or more points of the contour) of the second region based on a contour of the first labeled region and the registration relationship between the training image and the reference image. As another example, the processing device 140 may determine one or more feature points in the training image, which may correspond to one or more feature points of the first labeled region, and determine the second region based on the feature point(s) of the second region. As yet another example, the processing device 140 may transform the first labeled region based on the registration relationship between the training image and the reference image, and designate the transformed first labeled region as the second region.

The determination of the second region in the training image based on the first labeled region and the registration relationship between the training image and the reference image may significantly improve the determination accuracy of the second region and accordingly improve the diagnosis and/or treatment accuracy and efficiency in a subsequent process.

In 650, the processing device 140 (e.g., the model training module 340) may generate the identification model by training a preliminary identification model using the plurality of training images.

The preliminary identification model to be trained may have one or more model parameters. Exemplary model parameters may include the number (or count) of layers, the number (or count) of nodes, a loss function, or the like, or any combination thereof. Before training, the model parameter(s) may have their respective initial values. In the training of the preliminary identification model, the value(s) of the model parameter(s) of the preliminary identification model may be updated.

In some embodiments, the training of the preliminary identification model may include one or more iterations to iteratively update the model parameter(s) of the preliminary identification model. For illustration purposes, an exemplary current iteration of the iteration(s) is described in the following description. The current iteration may be performed based on at least a portion of the training samples. In some embodiments, the same set or different sets of training samples may be used in different iterations in training the preliminary identification model. For brevity, the training samples used in the current iteration are referred to as target training samples. In the current iteration, the updated preliminary identification model generated in a previous iteration may be evaluated. For example, for each of the training images, the processing device 140 may determine a second region by processing an inputted training image using an updated preliminary identification model generated in a previous iteration. The processing device 140 may then determine a value of the loss function of the updated preliminary identification model based on the predicted second region and the determined second region in the training image.

The loss function may be used to evaluate the accuracy and reliability of the updated preliminary identification model, for example, the smaller the loss function is, the more reliable the updated preliminary identification model is. Exemplary loss functions may include an L1 loss function, a focal loss function, a log loss function, a cross-entropy loss function, a Dice loss function, an L2 loss function, a mean bias error (MBE) function, a mean square error (MSE) function, etc. The processing device 140 may further update the value(s) of the model parameter(s) of the updated preliminary identification model to be used in a next iteration based on the value of the loss function according to, for example, a backpropagation algorithm.

In some embodiments, the aforementioned registration confidence level may affect the values of the loss function. For example, the processing device 140 may designate the registration confidence level a weight in the values of the loss function, thereby improving the training accuracy of the identification model.

In some embodiments, the one or more iterations may be terminated until a termination condition is satisfied in the current iteration. Exemplary termination conditions may be that the value of the loss function obtained in the certain iteration is less than a threshold value, that a certain count of iterations has been performed, that the loss function converges such that the difference of the values of the loss function obtained in a previous iteration and the current iteration is within a threshold value, etc. If the termination condition is satisfied in the current iteration, the processing device 140 may designate the updated preliminary identification model (or a portion thereof) as the identification model.

It should be noted that the above description regarding the process 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 7:
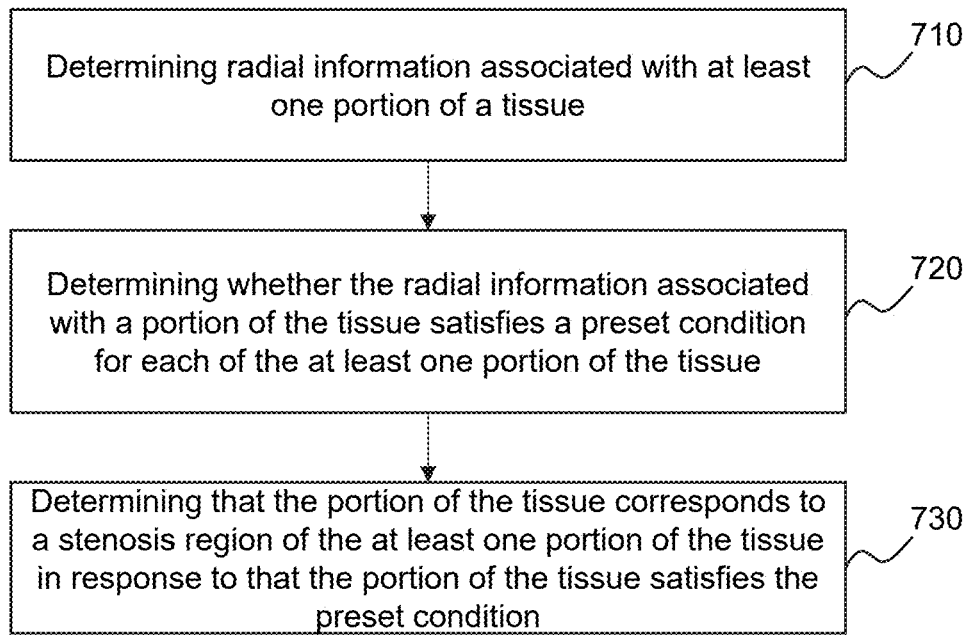
FIG. 7 is a flowchart illustrating an exemplary process for determining at least one stenosis region of a tissue according to some embodiments of the present disclosure.

FIG. 7 is a flowchart illustrating an exemplary process for determining at least one stenosis region of a tissue associated with a tissue according to some embodiments of the present disclosure. In some embodiments, process 700 may be an exemplary embodiment of the operation 420 as described in connection with FIG. 4. In some embodiments, one or more operations of process 700 illustrated in FIG. 7 may be implemented in the imaging system 100 illustrated in FIG. 1. For example, the process 700 may be stored in a storage device (e.g., the storage device 150, and/or the storage 220) of the imaging system 100 in the form of instructions, and invoked and/or executed by the processing device 140 (e.g., the processor 210, or one or more modules illustrated in FIG. 3). The operations of the illustrated process presented below are intended to be illustrative. In some embodiments, the process 700 may be accomplished with one or more additional operations not described and/or without one or more of the operations discussed. Additionally, the order in which the operations of the process as illustrated in FIG. 7 and described below is not intended to be limiting.

In 710, the processing device 140 (e.g., the determination module 320) may determine radial information associated with at least one portion of the tissue.

In some embodiments, the at least one portion of the tissue may be determined manually, semi-automatically, or automatically. Via a user interface implemented on the terminal device, the user may annotate the at least one portion of the tissue. As another example, the processing device 140 may determine in the image automatically without user intervention. Merely by way of example, the processing device 140 may select a portion of the tissue each certain distance (e.g., 0.1 mm, 1 mm, 3 mm, etc.) as the at least one portion of the tissue. As yet another example, the at least one portion of the tissue may be determined semi-automatically by the processing device 140 with user intervention. For example, a user may provide a parameter relating to a parameter relating to the determination of the at least one portion of the tissue. As another example, the user may make an adjustment to or confirm a preliminary at least one portion of the tissue identification performed by the processing device 140.

In some embodiments, a count of the at least one portion of the tissue may be determined based on actual needs, for example, 1, 3, 5, 8, 10, etc.

In some embodiments, the radial information of a specific portion of the tissue may include a diameter of the portion of the tissue, a shape of a cross section of the portion of the tissue, an area of the portion of the tissue, etc. In some embodiments, the processing device 140 may determine the radial information associated with at least one portion of the tissue based on structure data associated with the tissue as described in connection with FIGS. 4 and 5.

In 720, for each of the at least one portion of the tissue, the processing device 140 (e.g., the determination module 320) may determine whether the radial information associated with the portion of the tissue satisfies a preset condition.

In some embodiments, the preset condition may include that the diameter of the portion of the tissue may be greater than a diameter threshold (e.g., 1 um, 5 um, 10 um, 30 um, 1 mm, 3 mm, 5 mm, etc.), a ratio between a relatively long diameter to a relatively short diameter may be greater than a first ratio threshold, the area of the cross section of the portion of the tissue may be less than an area threshold, a shape of the cross section of the portion of the tissue is a predetermined shape, or the like, or any combination thereof.

In some embodiments, the processing device 140 may determine radial information associated with a plurality of portions of the tissue, and determine whether radial information associated with a portion of the tissue satisfies the preset condition based on the radial information associated with the plurality of portions of the tissue. For example, assumed that a current portion of the tissue is a portion A, the processing device 140 may determine a portion B and a portion C on the upstream and the downstream of the portion A, respectively. The processing device 140 may further determine whether a diameter of the portion A is less than a diameter of the portion B and a diameter of the portion C. In response to the determining that the diameter of the portion A is less than a diameter of the portion B, the processing device 140 may perform operation 730 to determine that the portion B correspond to a stenosis region of the at least one portion of the tissue. As another example, the processing device 140 may determine a current portion $A_1$, and a plurality of portions $B_1, B_2, B_3, \ldots, B_N$, wherein N refers to an integer, on the upstream of the portion $A_1$, and a plurality of portions $C_1, C_2, C_3, \ldots, C_M$, wherein M refers to an integer, on the downstream of the portion $A_1$. The processing device 140 may determine a number (or a count) of portions the diameter of which are greater than the diameter of the portion $A_1$. The processing device 140 may further determine a ratio between the determined number (or count) to (M+N). The processing device 140 may determine that the portion $A_1$ correspond to a stenosis region of the at least one portion of the tissue when the ration is greater than a second ratio threshold.

In 730, the processing device 140 (e.g., the determination module 320) may determine that the portion of the tissue corresponds to the stenosis region of the at least one portion of the tissue in response to that the portion of the tissue satisfies the preset condition.

It should be noted that the above description regarding the process 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 9:
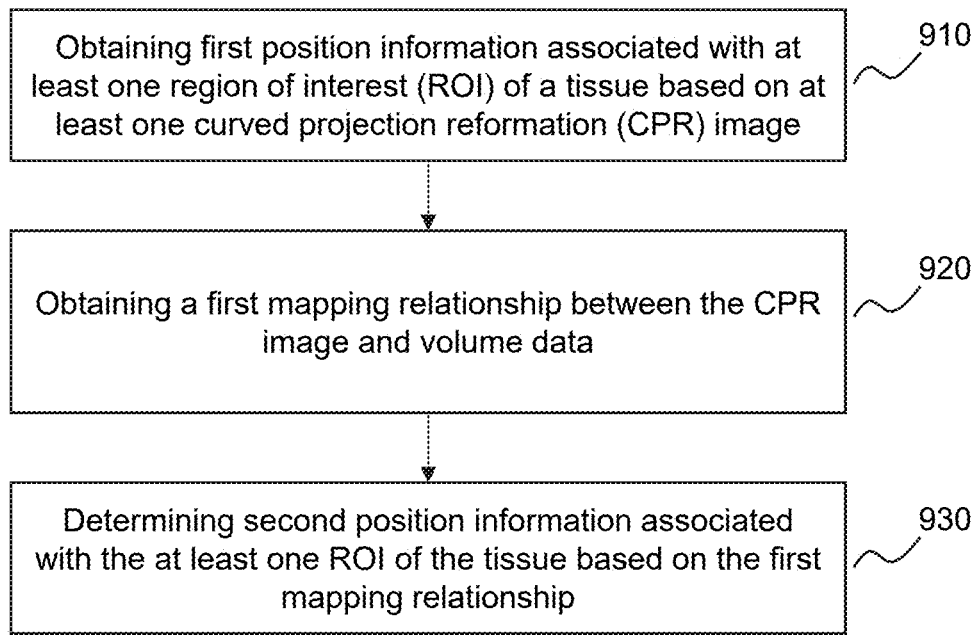
FIG. 9 is a flowchart illustrating an exemplary process for determining second position information associated with at least one ROI of a tissue according to some embodiments of the present disclosure.

FIG. 9 is a flowchart illustrating an exemplary process for determining second position information associated with at least one ROI of a tissue according to some embodiments of the present disclosure. In some embodiments, one or more operations of process 900 illustrated in FIG. 9 may be implemented in the imaging system 100 illustrated in FIG. 1. For example, the process 900 may be stored in a storage device (e.g., the storage device 150, and/or the storage 220) of the imaging system 100 in the form of instructions, and invoked and/or executed by the processing device 140 (e.g., the processor 210, or one or more modules illustrated in FIG. 3). The operations of the illustrated process presented below are intended to be illustrative. In some embodiments, the process 900 may be accomplished with one or more additional operations not described and/or without one or more of the operations discussed. Additionally, the order in which the operations of the process as illustrated in FIG. 9 and described below is not intended to be limiting.

In 910, the processing device 140 (e.g., the obtaining module 310) may obtain first position information associated with the at least one ROI of the tissue based on at least one curved planar reformation (CPR) image.

The CPR refers to a technique to generate a representation of an anatomical structure of a tissue that is not in a plane or curved in volume data, and the representation refers to the CPR image. In some embodiments, the CPR image may display an elongated tissue (e.g., the spine, the vessel, colon, etc.) in a plane, which may be not in a plane or curved in the volume data.

In some embodiments, the CPR image may be determined based on scan data (e.g., the raw data described in connection with operation 510, the at least one original image described in connection with operation 410, etc.) associated with the tissue, e.g., by performing curved surface reformation on the scan data to obtain the CPR image corresponding to the scan data. Specifically, the processing device 140 may determine a reference line of the tissue. In some embodiments, the reference line may include a centerline, a boundary curve, or any predetermined line in the scan data. The processing device 140 may determine a normal line of each pixel of the plurality of pixels on the reference line, determine a tangent line of the pixel, and determine a vertical line at the pixel which is perpendicular to the normal line and the tangent line. By traversing the pixels of the reference line, the processing device 140 may determine the CPR image based on the vertical lines of the pixels of the reference line. For example, the processing device 140 may generate the CPR image of the tissue by projecting a plurality of vertical lines on a plane.

Figure 10A:
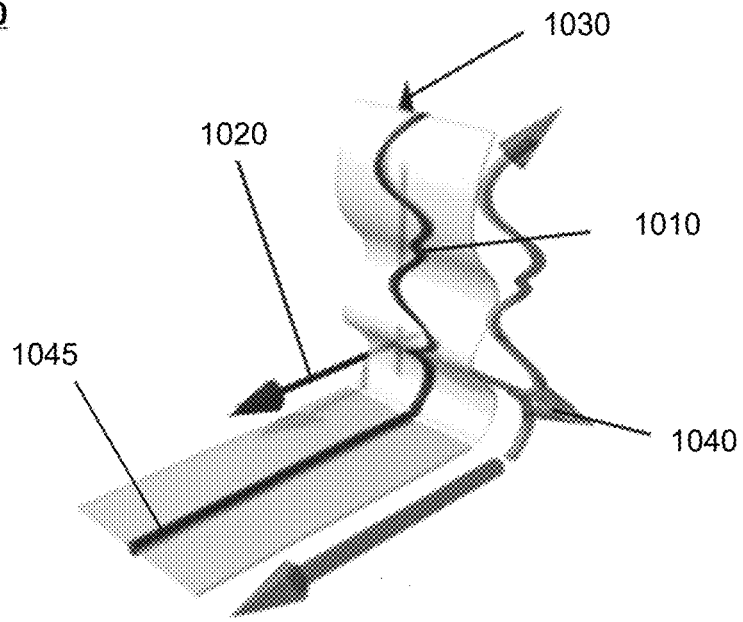
FIG. 10A is a schematic diagram illustrating a generation process of an exemplary coronary artery according to some embodiments of the present disclosure.

For illustration purposes, FIG. 10A is a schematic diagram illustrating a generation process of an exemplary coronary artery according to some embodiments of the present disclosure. As shown in FIG. 10A, a centerline 1010 of the coronary artery in the image 1000 may be regarded as a reference line. A normal line 1020 of the coronary artery at a pixel of a plurality of pixels of the coronary artery is determined, and a tangent line 1040 of the pixel is determined. A vertical line 1030 was further determined, which is perpendicular to the normal line 1020 and the tangent line 1040. The CPR image 1045 of the coronary artery may be determined by projecting a plurality of vertical lines of the plurality of pixels on a plane.

In some embodiments, a direction of a normal line of a pixel of the plurality of pixels of the scan data may be changed. A direction of a tangent line of the normal line and a direction of a tangent line perpendicular to the normal line and the tangent line may be changed. The pixels of the scan data where the reference line passes may be displayed on an image (e.g., the CPR image). Accordingly, the CPR image may be rotated, and one or more CPR images from different directions may be determined, and a user of the terminal 130 (e.g., a doctor) may observe or treat the tissue from different directions, thereby improving the efficiency of imaging of the imaging system 100 and user experience.

Figure 10B:
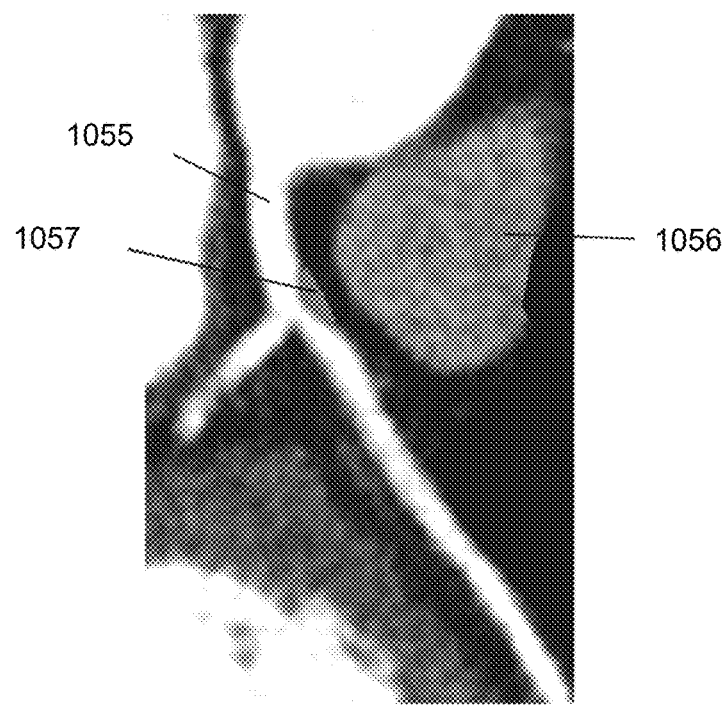
FIG. 10B is a schematic diagram illustrating an exemplary CPR image according to some embodiments of the present disclosure.

An ROI of a tissue may refer to a region in the tissue which may need to be marked or observed e.g., in a CPR image. In some embodiments, the ROI of the tissue may be determined based on actual need. For example, the ROI of the tissue may include a portion of the tissue, which may need to be further processed. As another example, the ROI of the tissue may include one or more anomalies in the tissue. More descriptions regarding the one or more anomalies may be found elsewhere in the present disclosure. See, e.g., operation. 520 and the relevant descriptions thereof. For illustration purposes, FIG. 10B is a schematic diagram illustrating an exemplary CPR image according to some embodiments of the present disclosure. As shown in FIG. 10B, the CPR image 1050 includes a coronary artery region 1055 and a bone region 1056. The coronary artery region 1055 may include a plaque 1057 which may be regarded as the ROI of the coronary artery region 1055.

In some embodiments, the at least one ROI may be determined manually, semi-automatically, or automatically. For example, the CPR image of the tissue may be transmitted and displayed on the terminal 130, a user may mark the at least one ROI in the CPR image with a color, a box, a point, etc. via a user interface implemented on the terminal device 130. As another example, the processing device 140 may determine the at least one ROI in the CPR image automatically without user intervention according to an image analysis technique (e.g., an image segmentation algorithm, an object recognition algorithm), a machine learning based technique (e.g., a trained neural network model for the first region label), or the like, or any combination thereof. As yet another example, the at least one ROI may be determined semi-automatically by the processing device 140 with user intervention. For example, a user may provide a parameter relating to a parameter relating to the image analysis technique and/or a position parameter relating to the at least one ROI. As another example, the user may make an adjustment to or confirm at least one preliminary ROI determination performed by the processing device 140.

In some embodiments, the first position information associated with the at least one ROI of the tissue refers to information relating to a position of the at least one ROI in the CPR image. For example, the first position information may be represented in various forms, for example, one or more coordinates, angles, etc. that can represent the position of the at least one ROI. Merely by way of example, the first position information associated with the at least one ROI in the CPR image may include a coordinate of a point (e.g., a center point, a gravity point, a contour point, etc.) of the ROI in an image coordinate system of the CPR image or the coordinate system 160.

In some embodiments, the processing device 140 may obtain the first position information in various manners. For example, the processing device 140 may obtain the first position information from the storage device. As another example, the processing device 140 may determine the first position information using a deep learning algorithm.

In 920, the processing device 140 (e.g., the obtaining module 310) may obtain a first mapping relationship between the CPR image and volume data associated with the tissue.

As used herein, volume data associated with a tissue refers to 3D data representing the tissue. In some embodiments, the volume data may include three-dimensional (3D) images and/or 3D data set representing the 3D images. The 3D data set may represent a scalar field acquired by a certain imaging device (e.g., the imaging device 110). In some embodiments, the 3D images may be a reconstructed 3D image e.g., reconstructed based on the scan data associated with the tissue, such as a 3D PET image, a 3D CT image, a 3D MR image, a 3D ultrasound image, or the like, or combination thereof. The 3D images may be generated based on a 3D reformation technique. Exemplary 3D reformation technique may include a volume rendering (VR) technique, a maximum intensity projection (MIP) technique, a minimum intensity projection (MinIP) technique, an average intensity projection (AIP) technique, a surface shade display (SSD) technique, a virtual endoscopy (VE) technique, or the like, or any combination thereof.

The first mapping relationship may include a corresponding relationship between information of the CPR image and information of the volume data. The information of the CPR image or the information of the volume data may include position information (e.g., a coordinate, an angle, etc.), parameter information (e.g., a diameter, an area, a gray value, a shape, etc.) associated with the CPR image or the volume data.

In some embodiments, the processing device 140 may determine the first mapping relationship between the CPR image and the volume data via various approaches. For example, the CPR image and the volume data may be determined based on the scan data, respectively. A mapping relationship may be determined between the scan data and the volume data, and a mapping relationship may be determined between the scan data and the CPR image. The processing device 140 may determine the first mapping relationship between the CPR image and the volume data based on the mapping relationship between the scan data and the volume data and the mapping relationship between the CPR image and the scan data. As another example, the first mapping relationship between the CPR image and the volume data may include a second mapping relationship between a plurality of pixels of the CPR image and a plurality of voxels of the volume data. The CPR image may include the plurality of pixels that may correspond to the tissue. The volume data associated with the tissue may include the plurality of voxels that may correspond to the tissue. The plurality of pixels in the CPR image may correspond to the plurality of voxels in the volume data, and the plurality of the pixels of the CPR image and the plurality of voxels in the volume data may correspond to the same tissue.

In some embodiments, the first mapping relationship between the CPR image and the volume data may be represented in the form of a table, a curve, a drawing, a mathematical expression, etc. The first mapping relationship between the CPR image and the volume data may be stored in a storage device, and the processing device 140 may retrieve the first mapping relationship from the storage device.

In 930, the processing device 140 (e.g., the determination module 320) may determine second position information associated with the at least one ROI of the tissue.

The second position information refers to information relating to a position of the at least one ROI in the volume data. In some embodiments, the second position information may indicate coordinate information of the at least one ROI in the volume data. In some embodiments, the processing device 140 may determine the second position information based on the first mapping relationship and the first position information. More descriptions regarding the second mapping relationship and the determination of the second position information may be found elsewhere in the present disclosure. See, e.g., FIG. 11 and the relevant descriptions thereof.

Figure 12:
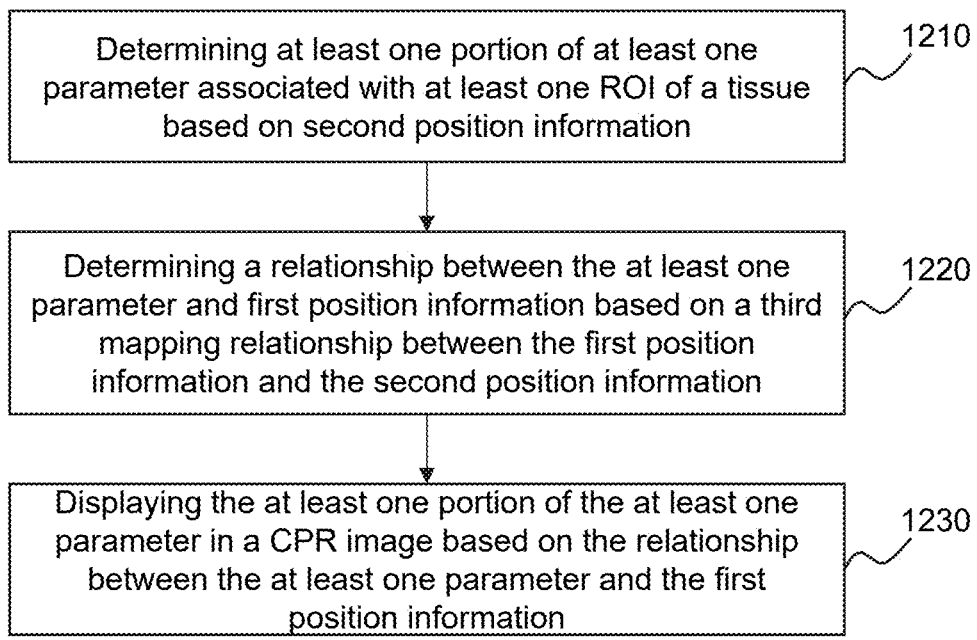
FIG. 12 is a flowchart illustrating an exemplary process for determining at least one parameter in a CPR image according to some embodiments of the present disclosure.

It should be noted that the above description regarding the process 900 is merely provided for the purposes of illustration, and not intended to limit the scope of the present disclosure. For persons having ordinary skills in the art, multiple variations and modifications may be made under the teachings of the present disclosure. For example, the process 900 may further include operations of process 1200 as illustrated in FIG. 12. However, those variations and modifications do not depart from the scope of the present disclosure.

Figure 11:
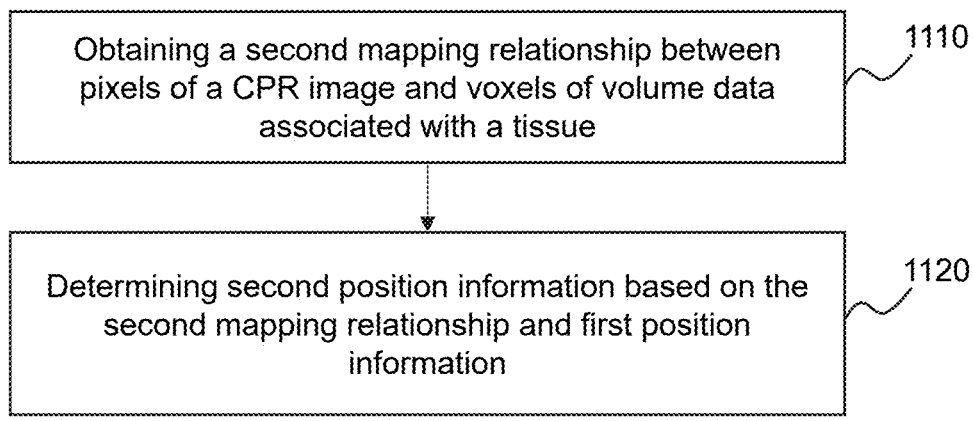
FIG. 11 is a flowchart illustrating an exemplary process for determining second position information according to some embodiments of the present disclosure.

FIG. 11 is a flowchart illustrating an exemplary process for determining second position information according to some embodiments of the present disclosure. In some embodiments, process 1100 may be an exemplary embodiment of the operation 930 as described in connection with FIG. 9. In some embodiments, one or more operations of process 1100 illustrated in FIG. 11 may be implemented in the imaging system 100 illustrated in FIG. 1. For example, the process 1100 may be stored in a storage device (e.g., the storage device 150, and/or the storage 220) of the imaging system 100 in the form of instructions, and invoked and/or executed by the processing device 140 (e.g., the processor 210, or one or more modules illustrated in FIG. 3). The operations of the illustrated process presented below are intended to be illustrative. In some embodiments, the process 1100 may be accomplished with one or more additional operations not described and/or without one or more of the operations discussed. Additionally, the order in which the operations of the process as illustrated in FIG. 11 and described below is not intended to be limiting.

In 1110, the processing device 140 (e.g., the obtaining module 310) may obtain a second mapping relationship between pixels of a CPR image and voxels of volume data associated with a tissue.

As used herein, the second mapping relationship between pixels of a CPR image and voxels of volume data refers to a mapping relationship between a coordinate of each of the pixels of the CPR image and a coordinate of a voxel in the volume data corresponding to the pixel of the CPR image. For example, coordinates of the pixels of the CPR image may be represented in a first coordinate system of the CPR image. Coordinates of the plurality of voxels of the volume data may be represented in a second coordinate system. The second mapping relationship may include a transformation relationship configured to transform the plurality of pixels of the CPR image and the plurality of voxels of the volume data into a same coordinate system (e.g., the coordinate system 160).

In some embodiments, the second mapping relationship may be represented in various forms. For example, the second mapping relationship may be represented in the form of a table, a curve, a drawing, a matrix, a mathematical expression, etc.

In some embodiments, the processing device 140 may obtain the second mapping relationship from a storage device (e.g., the storage device 150, and/or the storage 220). In some embodiments, the processing device 140 may determine the second mapping relationship based on scanning parameters (e.g., scanning parameters in a scanning protocol) of imaging devices for obtaining scan data configured to generate the CPR image and the volume data, respectively.

In 1120, the processing device 140 (e.g., the determination module 320) may determine the second position information based on the second mapping relationship and the first position information.

In some embodiments, the processing device 140 may determine the second position information based on first information associated with one or more feature points (e.g., a center point, a gravity point, a contour point, etc.) of at least one ROI of the tissue. For example, the processing device 140 may determine a coordinate of a voxel representing a center point of an ROI in the volume based on a coordinate of a pixel representing the center point of the ROI in the CPR image and the second mapping relationship.

In some embodiments, a type of the second position information may be the same as or different from the first position information.

It should be noted that the above description regarding the process 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 12 is a flowchart illustrating an exemplary process for determining at least one parameter in a CPR image according to some embodiments of the present disclosure. In some embodiments, one or more operations of process 1200 illustrated in FIG. 12 may be implemented in the imaging system 100 illustrated in FIG. 1. For example, the process 1200 may be stored in a storage device (e.g., the storage device 150, and/or the storage 220) of the imaging system 100 in the form of instructions, and invoked and/or executed by the processing device 140 (e.g., the processor 210, or one or more modules illustrated in FIG. 3). The operations of the illustrated process presented below are intended to be illustrative. In some embodiments, the process 1200 may be accomplished with one or more additional operations not described and/or without one or more of the operations discussed. Additionally, the order in which the operations of the process as illustrated in FIG. 12 and described below is not intended to be limiting.

In 1210, the processing device 140 (e.g., the determination module 320) may determine at least one portion of the at least one parameter associated with at least one ROI of a tissue based on second position information.

The at least one parameter associated with the at least one ROI may include a diameter (e.g., a maximum diameter, a minimum diameter, etc.), a volume, a gray value, an average gray value, an area, a shape, etc. of the at least one ROI. A maximum diameter of an ROI refers to a maximum length of a line connecting two points on a contour of the ROI and passing a centroid of the ROI. A minimum diameter of an ROI refers to a maximum length of a line connecting two points on a contour of the ROI and passing a centroid of the ROI. A volume of an ROI refers to a space occupied by the ROI. An average gray value of an ROI refers to an average value of gray of a plurality of pixels of the ROI. In some embodiments, the average gray value may include an arithmetic average gray value, a geometric average gray value, a weighted average gray value, etc. The average gray value may also include other data reflecting the overall degree, such as a median. In some embodiments, the processing device 140 may determine the average gray value after removing parts of the ROI with a gray value greater than or less than a gray value threshold. In some embodiments, the gray value threshold may be determined based on a type of the ROI, manually determined by the user, or automatically determined by the processing device 140. An area of an ROI refers to an area of a surface (e.g., a cross section) of the ROI.

In some embodiments, the processing device 140 may determine the at least one parameter using a parameter determination model. The parameter determination model may include a neural network model or other models. In some embodiments, the processing device 140 may input the first position information (or features associated with the first position information) and the second position information (or features associated with the second position information) into the parameter determination model, and the parameter determination model may output the at least one parameter, thereby improving the determination accuracy and efficiency of the at least one parameter associated with the tissue. In some embodiments, the parameter determination model may be trained using a plurality of training samples. The training samples may include exemplary inputs for the machine learning model and labels that indicate desired outputs corresponding to the exemplary inputs.

In some embodiments, the user may view the CPR image from any direction, and the at least one parameter associated with the ROI may be determined according to information (e.g., pixel information) of the ROI in the CPR image in one or more directions. For example, the processing device 140 may determine one or more candidate maximum diameters of the ROI in the CPR images determined from different directions, and select the maximum diameter of the ROI from the one or more candidate maximum diameters. As another example, the processing device 140 may determine one or more gray values of the ROI in the CPR images determined from different directions, and determine the average gray value of the ROI by averaging the one or more gray values.

In some embodiments, the processing device 140 may determine the at least one portion of at least one parameter associated with the at least one ROI of the tissue based on the second position information. For example, the processing device 140 may determine a center point and one or more contour point of a specific ROI in the volume data, and determine a maximum diameter, a minimum diameter, an average diameter, etc. of the ROI based on second information (e.g., coordinates) of the center point and the one or more contour point. Similarly, a volume of a specific ROI of the tissue may be determined. As another example, the processing device 140 may determine the average gray value of at least one ROI of the tissue based on gray values of the plurality of points in the contour of the tissue in the volume data.

In 1220, the processing device 140 (e.g., the determination module 320) may determine a relationship between the at least one parameter and the first position information based on a third mapping relationship between the first position information and the second position information.

The determination of the third mapping relationship between the first position information and the second position information may be the same as or similar to the determination of the second mapping relationship described in connection with operation 1110 in FIG. 11, which is not repeated herein. The at least one portion of at least one parameter may be determined based on the second position information as mentioned above. The processing device 140 may determine the relationship between the at least one parameter and the first position information based on the third mapping relationship. Take a maximum diameter of a specific ROI in the volume data as an example to illustrate, the maximum diameter may include a centroid point $A_1$ of the ROI, a point $A_2$ on a contour of the ROI, and a point $A_3$ on the contour of the ROI in the volume data. Based on the third mapping relationship between the first position information and the second position information, the processing device 140 may determine a centroid point $B_1$ of the ROI, a point $B_2$ on a contour of the ROI, and a point Ba on the contour of the ROI in the CPR image, which may correspond to the centroid point $A_1$, the point $A_2$, and the point $A_3$ respectively. Based on the centroid point $B_1$, the point $B_2$, and the point $B_3$, the processing device 140 may determine a maximum diameter of the ROI in the CPR image.

In 1230, the processing device 140 (e.g., the display module 330) may display the at least one portion of the at least one parameter associated with the at least one ROI of the tissue.

Figure 13:
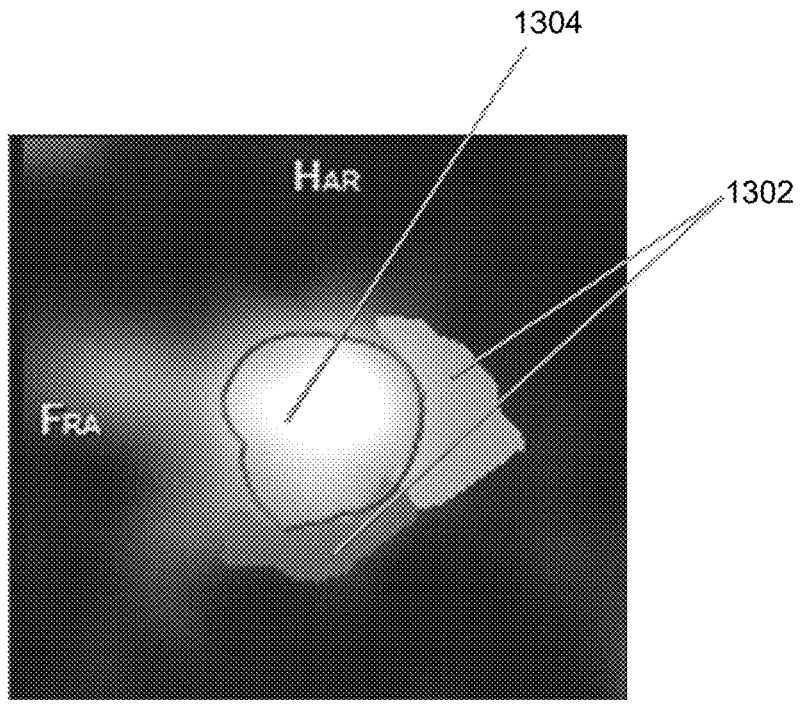
FIG. 13 is a schematic diagram illustrating an exemplary CPR image and an exemplary volume data of the coronary artery of a patient according to some embodiments of the present disclosure.
Figure 13:
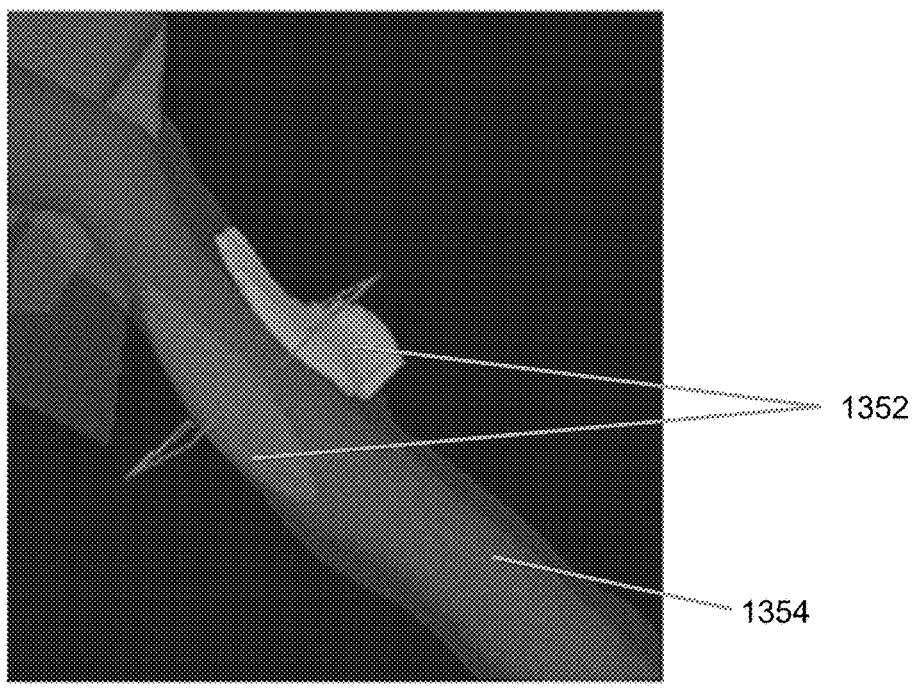

In some embodiments, the at least one portion of the at least one parameter may be displayed in the volume data (e.g., a close to the at least one ROI in the volume data). A user of the terminal 130 may further observe and/or analyze the at least one ROI of the tissue based on the display of the at least one portion of the at least one parameter associated with the at least one ROI of the tissue on the volume data. In some embodiments, the at least one portion of the at least one parameter may be displayed in the CPR image. The user of the terminal 130 may observe and/or analyze the at least one ROI of the tissue from different directions, thereby improving the accuracy and efficiency for diagnosing and treating the tissue. For illustration purposes, FIG. 13 is a schematic diagram illustrating an exemplary CPR image and an exemplary volume data of the coronary artery of a patient according to some embodiments of the present disclosure. As shown in FIG. 13, 1300 refers to the CPR image of a cross section of the coronary artery, and 1350 refers to the volume data of the coronary artery. In the CPR image 1300, 1302 refers to a plaque of the coronary artery, and 1304 refers to the coronary artery. In the volume data 1350, 1352 refers to a plaque corresponding to the plaque 1302 in the CPR image 1300, and 1354 refers to the coronary artery corresponding to the coronary artery 1304 in the COR image 1300.

Alternatively, the at least one portion of the at least one parameter associated with the at least one ROI of the tissue may be displayed in other images based on different needs. For example, the at least one parameter associated with the at least one ROI of the tissue may be displayed in a MIP image, a multiplanar reformation (MPR) image, or the like, or any combination thereof. The user of the terminal 130 may determine the position information (e.g., the first/second position information), at least one parameter associated with the at least one ROI of the tissue based on actual need, thereby improving the imaging efficiency of the imaging system 100.

In some embodiments, the at least one portion of the at least one parameter may be displayed automatically, displayed based on the user's instruction e.g., input by clicking the at least one ROI, displayed detailed information in another display area or display device. In some embodiments, the at least one portion of the at least one parameter may be displayed in various manners, for example, a graphical illustration, a text description, a voice description, an audio description, etc.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A non-transitory computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for image processing, implemented on a computing device having at least one processor and at least one non-transitory storage medium, the method comprising:
    determining raw data of a tissue based on at least one original image of the tissue;
    determining a target region in the at least one original image of the tissue by inputting the at least one original image into an identification model, the identification model being a trained model, the target region referring to an entire or a portion of a region representing one or more anomalies in the at least one original image of the tissue, wherein the tissue is a coronary artery, and the one or more anomalies include at least one of a stent or a plaque on the coronary artery;
    determining structure data of the tissue by removing the target region from the raw data; and
    determining, based on the structure data of the tissue, at least one stenosis region of the tissue, wherein at least one of the structure data or the at least one stenosis region of the tissue is configured to be displayed on a display device, and the determining raw data of a tissue based on at least one original image of the tissue includes:
        determine a plurality of centerlines of the tissue based on the at least one original image;
        naming the plurality of centerlines of the tissue, wherein the plurality of centerlines are named by inputting the plurality of centerlines into a centerline naming model that is a machine learning model; and
        determining the plurality of centerlines with names as the raw data, wherein the centerline naming model is trained by:
            obtaining a plurality of training samples, each of the plurality of training samples being determined based on a centerline parameter and centerline names corresponding to a centerline template of the tissue; and
            generating the centerline naming model by training a preliminary centerline naming using the plurality of training samples, wherein the centerline template is generated by:
                annotating a plurality of sample centerlines in at least one sample original image of the tissue;
                averaging the plurality of annotated centerlines on the at least one sample original image of the tissue; and
                generating the centerline template based on the averaged centerlines.

2. The method of claim 1, wherein the identification model is trained based on a training process comprising:
    obtaining a plurality of training images and a plurality of reference images corresponding to the plurality of training images;
    for each of the plurality of reference images,
        labeling a first region in the reference image;
        registering the reference image with a training image of the plurality of training images;
        determining a second region in the training image based on the first labeled region and a registration relationship between the training image and the reference image; and
    generating the identification model by training a preliminary identification model using the plurality of training images each of which is labeled with the second region corresponding to the first labeled region.

3. The method of claim 2, wherein the plurality of reference images include a plurality of images of the tissue which is not injected with a contrast agent.

4. The method of claim 1, wherein the determining the at least one stenosis region of the tissue based on the structure data of the tissue comprises:
    determining radial information associated with at least one portion of the tissue, wherein
    for each of the at least one portion of the tissue,
        determining whether the radial information associated with the portion of the tissue satisfies a preset condition; and
        in response to that the portion of the tissue satisfies the preset condition, determining that the portion of the tissue corresponds to a stenosis region of the at least one stenosis region of the tissue.

5. The method of claim 1, further comprising:
    obtaining, based on at least one curved planar reformation (CPR) image, first position information associated with at least one region of interest (ROI) of the tissue, the at least one CPR image corresponding to the structure data associated with the tissue, and the first position information indicating a position of the at least one ROI in the at least one CPR image;
    obtaining a first mapping relationship between the CPR image and volume data associated with the tissue; and
    determining, based on the first mapping relationship, second position information associated with the at least one ROI of the tissue, which indicates coordinate information of the at least one ROI in the volume data.

6. The method of claim 5, wherein the determining the second position information associated with the at least one ROI of the tissue comprises:
obtaining a second mapping relationship between pixels of the CPR image and voxels of the volume data; and
determining the second position information based on the second mapping relationship and the first position information.

7. The method of claim 5, further comprising:
determining at least one portion of at least one parameter associated with the at least one ROI of the tissue, wherein
the at least one portion of the at least one parameter associated with the at least one ROI of the tissue is configured to be displayed on the display device.

8. The method of claim 7, wherein the determining the at least one portion of the at least one parameter associated with the at least one ROI of the tissue comprises:
determining the at least one portion of the at least one parameter based on the second position information;
determining a relationship between the at least one parameter and the first position information based on a third mapping relationship between the first position information and the second position information; and
directing the display device to display the at least one portion of the at least one parameter in the CPR image based on the relationship between the at least one parameter and the first position information.

9. A system for image processing, comprising:
at least one storage device including a set of instructions; and
at least one processor configured to communicate with the at least one storage device, wherein when executing the set of instructions, the at least one processor is configured to direct the system to perform operations including:
determining raw data of a tissue based on at least one original image of the tissue;
determining a target region in the at least one original image of the tissue by inputting the at least one original image into an identification model, the identification model being a trained model, the target region referring to an entire or a portion of a region representing one or more anomalies in the at least one original image of the tissue, wherein the tissue is a coronary artery, and the one or more anomalies include at least one of a stent or a plaque on the coronary artery;
determining structure data of the tissue by removing the target region from the raw data; and
determining, based on the structure data of the tissue, at least one stenosis region of the tissue, wherein at least one of the structure data or the at least one stenosis region of the tissue is configured to be displayed on a display device, and the determining raw data of a tissue based on at least one original image of the tissue includes:
determine a plurality of centerlines of the tissue based on the at least one original image;
naming the plurality of centerlines of the tissue, wherein the plurality of centerlines are named by inputting the plurality of centerlines into a centerline naming model that is a machine learning model; and
determining the plurality of centerlines with names as the raw data, wherein the centerline naming model is trained by:
obtaining a plurality of training samples, each of the plurality of training samples being determined based on a centerline parameter and centerline names corresponding to a centerline template of the tissue; and
generating the centerline naming model by training a preliminary centerline naming using the plurality of training samples, wherein the centerline template is generated by:
annotating a plurality of sample centerlines in at least one sample original image of the tissue;
averaging the plurality of annotated centerlines on the at least one sample original image of the tissue; and
generating the centerline template based on the averaged centerlines.

10. The system of claim 9, wherein the identification model is trained based on a training process comprising:
obtaining a plurality of training images and a plurality of reference images corresponding to the plurality of training images;
for each of the plurality of reference images,
labeling a first region in the reference image;
registering the reference image with a training image of the plurality of training images;
determining a second region in the training image based on the first labeled region and a registration relationship between the training image and the reference image; and
generating the identification model by training a preliminary identification model using the plurality of training images each of which is labeled with the second region corresponding to the first labeled region.

11. The system of claim 10, wherein the plurality of reference images include a plurality of images of the tissue which is not injected with a contrast agent.

12. The system of claim 10, wherein the plurality of training images are captured when a sample tissue is injected with a contrast agent.

13. The system of claim 9, wherein the determining the at least one stenosis region of the tissue based on the structure data of the tissue comprises:
determining radial information associated with at least one portion of the tissue, wherein
for each of the at least one portion of the tissue,
determining whether the radial information associated with the portion of the tissue satisfies a preset condition; and
in response to determining that the portion of the tissue satisfies the preset condition, determining that the portion of the tissue corresponds to a stenosis region of the at least one stenosis region of the tissue.

14. The system of claim 9, wherein the at least one processor is further configured to direct the system to perform the operations including:
obtaining, based on at least one curved planar reformation (CPR) image, first position information associated with at least one region of interest (ROI) of the tissue, the at least one CPR image corresponding to the structure data associated with the tissue, and the first position information indicating a position of the at least one ROI in the at least one CPR image;
obtaining a first mapping relationship between the CPR image and volume data associated with the tissue; and
determining, based on the first mapping relationship, second position information associated with the at least one ROI of the tissue, which indicates coordinate information of the at least one ROI in the volume data.

15. A non-transitory computer readable medium, comprising a set of instructions for image processing, wherein when executed by at least one processor, the set of instructions direct the at least one processor to effectuate a method, the method comprising:

determining raw data of a tissue based on at least one original image of the tissue;

determining a target region in the at least one original image of the tissue by inputting the at least one original image into an identification model, the identification model being a trained model, the target region referring to an entire or a portion of a region representing one or more anomalies in the at least one original image of the tissue, wherein the tissue is a coronary artery, and the one or more anomalies include at least one of a stent or a plaque on the coronary artery;

determining structure data of the tissue by removing the target region from the raw data;

determining, based on the structure data the tissue, at least one stenosis region of the tissue, wherein at least one of the structure data or the at least one stenosis region of the tissue is configured to be displayed on a display device, and the determining raw data of a tissue based on at least one original image of the tissue includes:

determine a plurality of centerlines of the tissue based on the at least one original image;

naming the plurality of centerlines of the tissue, wherein the plurality of centerlines are named by inputting the plurality of centerlines into a centerline naming model that is a machine learning model; and determining the plurality of centerlines with names as the raw data, wherein the centerline naming model is trained by:

obtaining a plurality of training samples, each of the plurality of training samples being determined based on a centerline parameter and centerline names corresponding to a centerline template of the tissue; and generating the centerline naming model by training a preliminary centerline naming using the plurality of training samples, wherein the centerline template is generated by:

annotating a plurality of sample centerlines in at least one sample original image of the tissue;

averaging the plurality of annotated centerlines on the at least one sample original image of the tissue; and generating the centerline template based on the averaged centerlines.

* * * * *